(12) United States Patent
Charpentier et al.

(10) Patent No.: US 12,734,710 B1
(45) Date of Patent: Sep. 15, 2026

(54) AUTOMATED DRAWING APPARATUS, SYSTEM AND METHOD

(71) Applicant: Picture Mosaics LLC, Blue Bell, PA (US)

(72) Inventors: Albert Joseph Charpentier, Phoenixville, PA (US); Joseph Walter Charpentier, Schwenksville, PA (US)

( * ) Notice: Subject to any disclaimer, the term of this patent is extended or adjusted under 35 U.S.C. 154(b) by 48 days.

(21) Appl. No.: 19/048,885

(22) Filed: Feb. 8, 2025

Related U.S. Application Data

(60) Provisional application No. 63/551,718, filed on Feb. 9, 2024.

(51) Int. Cl.
*G06F 17/00* (2019.01)
*B25J 11/00* (2006.01)
*B25J 15/00* (2006.01)

(52) U.S. Cl.
CPC ....... *B25J 15/0066* (2013.01); *B25J 11/0075* (2013.01)

(58) Field of Classification Search
CPC .......................... B25J 15/0066; B25J 11/0075
USPC ......................................................... 700/245
See application file for complete search history.

(56) References Cited

U.S. PATENT DOCUMENTS 5,050,001 A 9/1991 Hatanaka
5,234,340 A 8/1993 Hambright
5,649,032 A 7/1997 Burt
6,137,498 A 10/2000 Silvers
6,532,312 B1 3/2003 Corkran
7,565,028 B2 7/2009 Saed
10,957,014 B1 3/2021 Charpentier
2009/0071281 A1* 3/2009 Fisk ....................... B25J 19/023 901/29
2020/0302263 A1* 9/2020 Douek .................. G06N 3/006
2022/0097228 A1* 3/2022 Schaefer .............. G06V 30/414
2023/0035296 A1* 2/2023 Søe-Knudsen ........ B25J 9/1638
2023/0342430 A1* 10/2023 Pallikonda ............ G06N 20/00

FOREIGN PATENT DOCUMENTS

CN 117835935 A * 4/2024 ............. A61B 34/37
DE 102021131309 A1 * 6/2023 .............. B25J 9/106
DE 102022126597 B3 * 12/2023 ........... H05K 13/041
EP 3253540 B1 * 8/2021 ............ B25J 9/1692
(Continued)

OTHER PUBLICATIONS

Deep Robot Sketching (Year: 2023).*
Fei Gao, Making Robots Draw a Vivid Portrait in Two Minutes, aiit.org.cn, Peking University (May 12, 2020).

*Primary Examiner* — Ronnie M Mancho
(74) *Attorney, Agent, or Firm* — Robert J. Yarbrough of Lipton, Weinberger & Husick

(57) ABSTRACT

A computer-controlled robot arm is configured to draw on a substrate. The robot is capable of picking up, drawing with, and releasing multiple different drawing implements serially to, for example, prepare a line drawing having a plurality of colors. In a first embodiment, the robot arm picks up and releases a drawing implement vertically. In a second embodiment, the robot arm picks up and releases the drawing implement horizontally. A dispenser holds and dispenses the substrate and also controls the force applied to the substrate by the robot arm and drawing implements. A completed drawing may be incorporated into a mosaic image or collage.

20 Claims, 23 Drawing Sheets

(56) References Cited

FOREIGN PATENT DOCUMENTS

| | | | | | |
|---|---|---|---|---|---|
| EP | 2743039 | B1 | * | 3/2024 | ............ B25J 9/0018 |
| EP | 4081374 | B1 | * | 12/2024 | ........... G05B 19/416 |
| WO | WO-2021122105 | A1 | * | 6/2021 | ............. B25J 9/104 |

* cited by examiner

AUTOMATED DRAWING APPARATUS, SYSTEM AND METHOD

FIELD OF THE INVENTION

A computer-controlled robot arm is configured to draw on a substrate. The robot is capable of picking up, drawing with, and releasing multiple different drawing implements serially to, for example, prepare a line drawing having a plurality of colors. In a first embodiment, the robot arm picks up and releases a drawing implement vertically. In a second embodiment, the robot arm picks up and releases the drawing implement horizontally. A dispenser holds and dispenses the substrate and also controls the force applied to the substrate by the robot arm and drawing implements. A completed drawing may be incorporated into a mosaic image or collage.

BACKGROUND OF THE INVENTION

The making of mosaic images from smaller source images is known in the art. See, for example, U.S. Pat. No. 10,957,014 to Charpentier, issued Mar. 23, 2021, U.S. Pat. No. 6,137,498 to Silvers issued Oct. 24, 2000, and U.S. Pat. No. 7,565,028 to Saed issued Jul. 21, 2009, all of which are hereby incorporated by reference as if fully set forth herein. Robots that can prepare a drawing of a face or other subject from an image also are known in the art, for example Fei Gao, "Making Robots Draw a Vivid Portrait in Two Minutes, aiit.org.cn, Peking University (May 12, 2020), which is hereby incorporated by reference as if fully set forth herein.

SUMMARY OF THE INVENTION

This Invention relates to the automated production of a line drawing by a robot arm. A robot arm having three or more axes of freedom may be operably connected to a computer, configured to hold a drawing implement, and to draw on a substrate using the drawing implement. The computer may include a microprocessor and computer memory and be configured to receive image information to be converted into a drawing by the robot arm. The image information may be derived directly from a camera operably connected to the microprocessor or may be derived from an image file supplied to the microprocessor. In processing the image information, the computer may be programmed to apply algorithms such as edge detection to detect changes in brightness, contrast, or color of the image, as is known in the art. The microprocessor may be programmed to instruct the robot arm to mark the substrate at a location corresponding to the edge detected by the microprocessor and with a color corresponding to the color detected by the microprocessor.

The system of the Invention may include a plurality of drawing implements located in a plurality of storage locations. Each drawing implement has a drawing implement longitudinal axis, a drawing implement first end and a drawing implement second end. In a first embodiment, the drawing implement second end is configured to releasably connect the drawing implement to the drawing implement holder of the robot arm. The drawing implement first end includes a drawing tip.

As used herein, the term 'drawing tip includes any apparatus capable of leaving a mark on a substrate by touch or proximity, including without limitation a pencil, a pen or other ink dispenser, a marker, charcoal, chalk, graphite, pastels, paint pens, pastel pens, pastel gel pens, brushes, brush pens, or any other apparatus capable of delivering a marking agent such as an ink, paint, or particulate matter to a location on a substrate and any apparatus capable of moving, blending or removing the marking agent on or from the substrate, such as a painting knife, pallet knife, brush, eraser or magnet.

Each drawing implement may be configured to mark the substrate with a different color than another of the drawing implements. The microprocessor may cause the robot arm to serially apply one or more colors to the substrate to create the finished drawing. The microprocessor may cause the robot arm to draw with any number of drawing implements using any number of colors. For example, the microprocessor may be programmed to cause the robot arm to pick up a first drawing implement from a first storage location, to move the first drawing implement to mark the substrate, to return the first drawing implement to the first storage location, and release the first drawing implement at the first storage location, ready to be picked up the next time that the first drawing implement is needed. The microprocessor then may be programmed to cause the robot arm to move to pick up a second drawing implement from a second storage location, to move the second drawing implement to mark the substrate, to return the second drawing implement to the second storage location, and to release the second drawing implement at the second storage location, ready to be picked up the next time the second drawing implement is needed. The first and second drawing implements may be configured to leave marks of different colors, allowing the computer combined with the robot arm to prepare a drawing of one, two, or more colors.

The system for the robot arm to pick up, use, and release the drawing implements includes a robot arm. The robot arm has an operating end that is rotatable about a robot arm axis of rotation and that is also movable axially and radially with respect to the robot arm axis of rotation, providing the operating end with three degrees of freedom and all under the control of a microprocessor. The robot arm also has a holder disposed at the operating end that is configured to pick up, move, and release any of a plurality of drawing implements. The microprocessor may direct the robot arm to pick up the drawing implement at a first storage location and to drop off the drawing implement at a different storage location, provided the different storage location is not occupied by a drawing implement.

In a first embodiment, the robot arm picks up and releases the drawing implements vertically. For the first embodiment, the holder may have a generally hollow cylindrical shape that is configured to receive and retain the drawing implement. The holder has a holder longitudinal axis that is parallel to the robot arm axis of rotation. The holder longitudinal axis corresponds to the drawing implement longitudinal axis when the holder is holding a drawing implement. A holder first end is configured to receive the drawing implement. The holder first end may have a cone-shaped or flared opening to accommodate misalignment of the robot arm and the drawing implement when the robot arm is picking up the drawing implement. The holder second end is configured to retain the drawing implement when the holder is in engagement with the drawing implement.

In the first embodiment, the configuration of the holder second end to retain the drawing implement may be a combination of mutually attractive magnetic elements. The mutually attractive magnetic elements may be a magnet and a ferrous disk or a combination of two magnets. The magnet may be composed of any suitable magnetic material, such as an iron magnet or a neodymium magnet. Where a magnet is paired with a ferrous disk, one of the magnet and the ferrous disk is attached to the drawing implement and the other of the magnet and ferrous disk is attached to the holder second end. As a result, the drawing implement is attracted to and retained by the holder when the holder and drawing implement are in engagement. The magnetic element disposed in the second end of the holder is penetrated by a hole that is aligned with the holder longitudinal axis. The hole is sized to receive an ejecting pin to eject the drawing implement from the holder, as discussed in the following paragraphs.

Alternatively for the first embodiment, the configuration of the holder second end to receive and retain the drawing implement second end may comprise an interference fit between the holder second end and the drawing implement second end. Other alternatives may include a spring, such as a flat spring, attached to one of the holder second end and the drawing implement second end and configured to bear upon the other of the holder second end and the drawing implement second end, or a releasable adhesive connection, or a snap, or a clasp or latch, or a threaded connection, or generally any connection known in the art to releasably attach one object to another. Any reference in this document to a magnet or a magnetic engagement or a magnetic attachment between the drawing implement and the holder also means any alternative engagement between the drawing implement and the holder.

The system of the first embodiment includes a platform defining a plurality of the storage locations. Each storage location has a storage location longitudinal axis parallel to the robot arm axis of rotation and hence to the holder longitudinal axis. The storage locations may be disposed in an arc with each of the storage locations being equidistant from the robot arm axis of rotation. Each storage location defines a generally cylindrical receptacle configured to receive a first end of the drawing implement and to support the drawing implement so that the drawing implement longitudinal axis is substantially coextensive with the storage location longitudinal axis when the drawing implement is stored at the storage location.

The following paragraphs describe the operation of the system of the first embodiment. To engage the drawing implement with the drawing implement holder on the robot arm, the microprocessor will cause the robot arm to position the drawing implement holder directly above the storage location so that the holder longitudinal axis is aligned with the storage location longitudinal axis. The microprocessor will cause the robot arm to move the drawing implement holder in a downward direction along the storage location axis so that the holder second end receives the drawing implement second end and until the drawing implement second end and the holder second end magnetically attach. The drawing implement is now supported by the holder. The robot arm will then lift the drawing implement from the storage location, ready to draw on the substrate.

Disposed directly above each storage location along the storage location longitudinal axis is an elongated ejecting pin. The ejecting pin has a top end, a bottom end, and a length between the top and bottom ends. The length of the ejecting pin is aligned with the storage location longitudinal axis. The top of the pin is attached to and supported by the platform in a stationary location with respect to the storage location.

To release the drawing implement from the holder and return the drawing implement to its storage location, the robot arm will cause the holder with the drawing implement attached to align with the storage location longitudinal axis and with the corresponding ejecting pin. The robot arm with then move the holder vertically upward along the storage location longitudinal axis until the holder second end encounters the ejecting pin bottom end. As the robot arm moves the holder vertically upward, the ejecting pin will pass through the hole communicating through holder second end and the magnetic element attached to the holder second end. The elongated pin will then bear upon the drawing implement second end. As the robot arm continues to move the holder in the upward direction, the elongated pin will push the magnetic elements out of engagement, and the drawing implement will fall by gravity along the storage location longitudinal axis until the drawing implement first end falls into the storage location. The storage location then will support the drawing implement so that the drawing implement longitudinal axis is substantially coextensive with the storage location longitudinal axis.

Optionally, a spacer may be disposed on the second end of the drawing implement or on the second end of the holder, between the magnetic elements of the drawing implement and the holder. The purpose of the spacer is to reduce the magnetic attraction between the two magnetic elements when the magnetic elements are in engagement, and hence to reduce the force required to separate the drawing implement and the holder. The spacer may also serve to cushion the two magnetic elements and hence reduce the impact and noise when the drawing implement and the holder engage.

In the second embodiment, the robot arm moves horizontally to pick up and releases the drawing implement. For the second embodiment, each drawing implement has an implement engagement surface disposed on a side of the drawing implement. The implement engagement surface may be attached to a conventional drawing implement using a clamp. The implement engagement surface may be substantially parallel to the drawing implement longitudinal axis. The implement engagement surface is configured for selectable engagement with a robot arm engagement surface attached to the robot arm. The holder defines a robot arm engagement surface disposed at the operating end of the robot arm. The robot arm engagement surface is oriented radially away from the robot arm axis of rotation. The implement engagement surface of each drawing implement in each storage location is oriented radially toward the robot arm axis of rotation and in a spaced-apart relation to the robot arm axis of rotation.

In the second embodiment, the implement engagement surface and the robot arm engagement surface include corresponding mutually attractive magnetic features that magnetically attract the drawing implement to the robot arm when the implement engagement surface and the robot arm engagement surface are engaged. The implement engagement surface and the robot arm engagement surface also include corresponding physical features that mate to prevent rotation of the implement engagement surface with respect to the robot arm engagement surface when the implement engagement surface and the robot arm engagement surface are engaged. For example, the robot arm engagement surface or the implement engagement surface may include one or more physical shapes such as pins, cones, spherical sections, pyramids, irregular shapes, curved shapes, or any other shapes that extend from the surface of the implement engagement surface or robot arm engaging surface and that engage with corresponding depressions in the surface of the other of the robot arm engagement surface or the implement engagement surface. When the implement engagement surface and the robot arm engagement surface are engaged, the corresponding shapes mate to prevent rotation of the drawing implement with respect to the robot arm in a direction normal to the radial direction.

In use, a drawing implement of the second embodiment may be disposed in a tubular storage location radially disposed about the robot arm axis of rotation. The microprocessor will cause the robot arm to rotate about the robot arm axis of rotation until the radial location of the robot arm engagement surface corresponds to the radial location of the implement engagement surface. The microprocessor will also cause the robot arm to move so that the axial location of the robot arm engagement surface along the robot arm axis or rotation corresponds to the location of the implement engagement surface along the robot arm axis of rotation. The microprocessor will cause the robot arm to move radially away from the robot arm axis of rotation until the robot arm engagement surface physically engages the implement engagement surface. The corresponding magnetic features of the implement engagement surface and the robot arm engagement surface mutually attract, securing the drawing implement to the robot arm and engaging the corresponding shapes of the robot arm engagement surface and the implement engagement surface. The robot arm will move the robot arm engagement surface vertically until the drawing implement clears the tubular storage location. The microprocessor will cause the robot arm to move the drawing implement to the substrate and will cause the drawing implement to make marks on the substrate.

When the microprocessor is finished with the drawing implement, it will cause the robot arm to return the drawing implement to the tubular storage location or to another tubular storage location that is not occupied by another drawing implement. Once the drawing implement is within the storage location, the robot arm will move the robot arm engagement surface radially toward the robot arm axis of rotation. The walls of the tubular storage location will resist movement of the drawing implement in the radial direction. When the force exerted by the robot arm exceeds the force of the magnetic attraction, the drawing implement is released from the robot arm. The microprocessor may cause the robot arm to move to and engage another drawing implement. Other than the connection and disconnection of the drawing implement from the robot arm, this second embodiment operates in the same manner as the first embodiment.

For either embodiment, the system of the Invention may include a platform. The platform locates the robot arm, the storage locations, and the substrate in three-dimensional space relative to each other. The platform and platform may include features such as fasteners, pins, clips, sockets or walls to fix the robot arm base, platform, storage locations, ejecting pins and substrate in their reference locations.

For either the first or the second embodiment, the substrate may be held by a dispenser. The dispenser defines a dispenser body having an internal volume. The internal volume defines a length and a width. The length and width accommodate a stack of the substrates in the internal volume. A pressure plate is disposed immediately below the stack of substrates. One or more springs urge the pressure plate and hence the stack of substrates in an upward direction within the internal volume. The pressure plate is movable within the interior volume and spreads the force exerted by the one or more springs on the stack of substrates. The pressure plate also locally supports the substrates in the stack against the downward force exerted on the substrates by the drawing implement when the robot arm is drawing on the top substrate. A plurality of stops limits the upward movement of the stack of substrates and pressure plate. The top substrate in the stack is exposed at the top of the dispenser and available for drawing by the robot arm.

The dispenser body includes a loading slot disposed on a first end of the body. To load a stack of substrates into the dispenser, a user will manually press downward on the pressure plate until the top of the pressure plate is below the loading slot. The user will then insert the stack of substrates through the loading slot and release the pressure plate and stack of substrates.

A second end of the dispenser body opposite to the first end defines a dispensing slot. The dispensing slot has a width corresponding to the width of a substrate. The slot has a thickness to accept one of the substrates. The slot has a top defined by the bottom of the plurality of stops. This configuration of the dispensing slot allows a user to, for example, use his or her finger (or a friction tool such as a rubber eraser) to slide the uppermost substrate in the stack horizontally out of engagement with the plurality of stops, the remaining substrates in the stack, and the support plate, all without moving the dispenser body.

Alternatively, the robot arm may pick up a friction tool in the same manner described above for picking up a drawing implement and may use the friction tool to slide the topmost substrate out of the dispenser. The friction tool may be an elongated tool similar in shape to a drawing implement, but that exhibits a friction surface instead of a drawing tip. An example friction tool would be a rubber eraser attached to the end of a pencil. The robot arm may return the friction tool to a storage location in the same manner that it returns a drawing implement to a storage location. The use of the dispenser is not limited to the first or second embodiments described herein and may be used with any drawing tool.

U.S. Provisional Patent Application 63/551,718 filed Feb. 9, 2024 is hereby incorporated by reference as if set forth in full herein.

DETAILED DESCRIPTION OF THE INVENTION

FIGS. 1 through 13 illustrate a first embodiment of the apparatus and system of the Invention, while FIGS. 14 through 18 illustrate a second embodiment.

Figure 1:
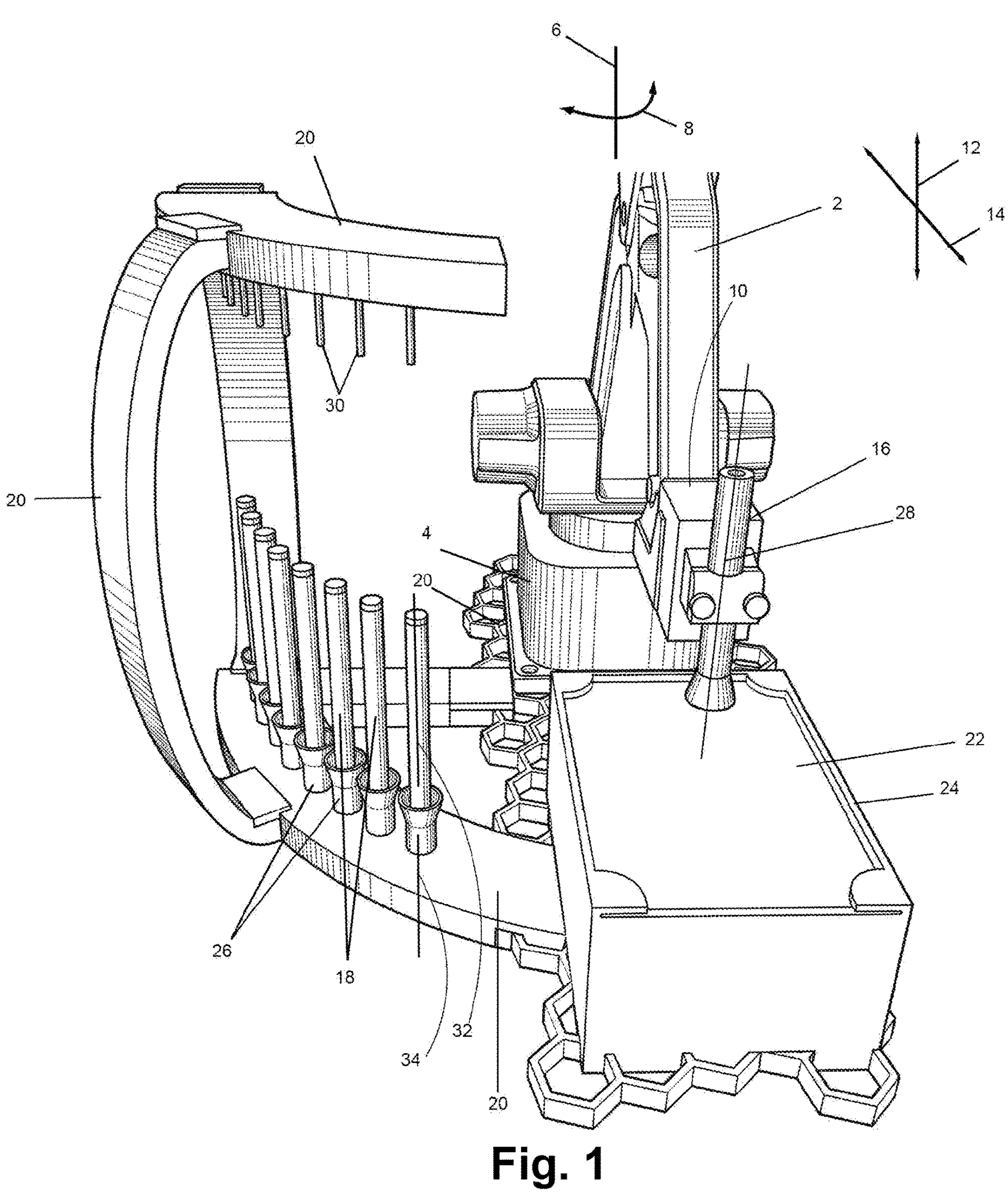
FIG. 1 is a perspective view of the system of the Invention.

FIG. 1 is perspective view showing the apparatus and system of the first embodiment. A robot arm 2 is controlled by a microprocessor and supported by a base 4. The robot arm 2 is rotatable (indicated by arrow 6) about a robot arm axis of rotation 8. An operating end 10 of the robot art 2 is movable in an axial direction 12 and in a radial direction 14, in addition to rotating with the robot arm 2 about the robot arm axis of rotation 6. A holder 16 is attached to the robot arm operating end 10. The holder 16 is configured to retain and release any of a plurality of drawing implements 18. In use, the robot arm 2, under the control of the microprocessor picks up a drawing implement 18 from a storage location 26 and moves the drawing implement 18 to mark a substrate 22. The robot arm 2 returns the drawing implement 18 to the storage location 26 and picks up another drawing implement 18 from another storage location 26. By serially selecting drawing implements 18 and marking the substrate 22, the apparatus may create, for example, a drawing on the substrate 22 having two or more colors or line qualities.

From FIG. 1, a platform 20 supports the robot arm base 4 in a fixed, known position and also supports the drawing implements 18 and the substrate 22 in known positions. A microprocessor (not shown) controls the motions of the robot arm 2. The substrate 22 may be contained by a dispenser 24, described below relating to FIGS. 19-22. The holder 16 has a holder longitudinal axis 28 that is generally parallel to the robot arm axis of rotation 8 as the robot arm 2 moves the holder 16 to retrieve and release drawing implements 18 and to draw on the substrate 22. Ejecting pins 30 allow the robot arm 2 to release the drawing implements 18 from the holder 16, as described below.

From FIG. 1, the robot arm 2 moves under the control of a microprocessor. The microprocessor receives image information, as from a camera (not shown) operably attached to the microprocessor, or in the form of an image file. The microprocessor converts the image information to line drawing information by applying algorithms, such as edge detection, to detect changes in contrast, intensity, or color, all as known in the art. The microprocessor converts the line drawing information into instructions to the robot arm 2 to move the holder 16 in three-dimensional space to serially pick up drawing implements 18 and to draw on a substrate 22, all as described below.

As shown by FIG. 1, the platform 20 may be honeycomb-shaped, as shown by FIGS. 1-13 or may be any suitable shape that fixes the base 4, dispenser 24, drawing implements 18, and ejecting pins 30 in known positions so that the microprocessor can direct the robot arm 2 to those positions. In the example of FIGS. 1-13, the honeycomb platform 20 snaps together and apart for ease of transport, assembly and disassembly.

From FIG. 1, when the platform 20 is supported on a flat and level surface, each storage location 26 and each ejecting pin 30 is located so that each storage location 26 can support a drawing implement 18 with the drawing implement longitudinal axis 32 parallel to the robot arm axis of rotation 8 and the ejecting pin 30 aligned with the drawing implement longitudinal axis 32 and the storage location longitudinal axis 34. The ejecting pin 30 is located directly above the corresponding storage location 26. The storage locations 26 are radially disposed about the robot arm axis of rotation 8 so that the robot arm 2 has unobstructed access to each of the storage locations 26 and each of the ejecting pins 30.

Figure 2:
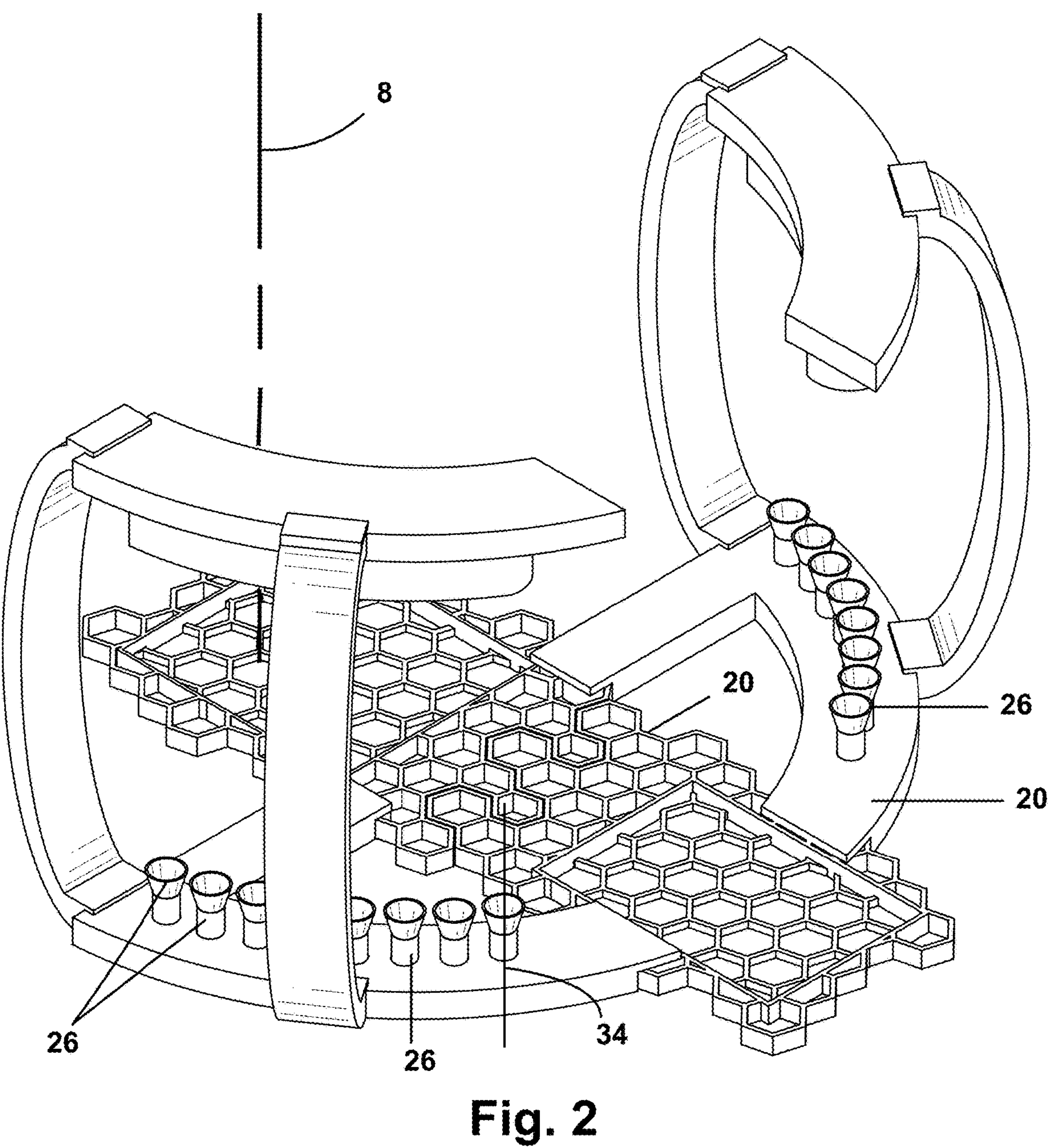
FIG. 2 is a perspective view of the platform and platform from above.
Figure 3:
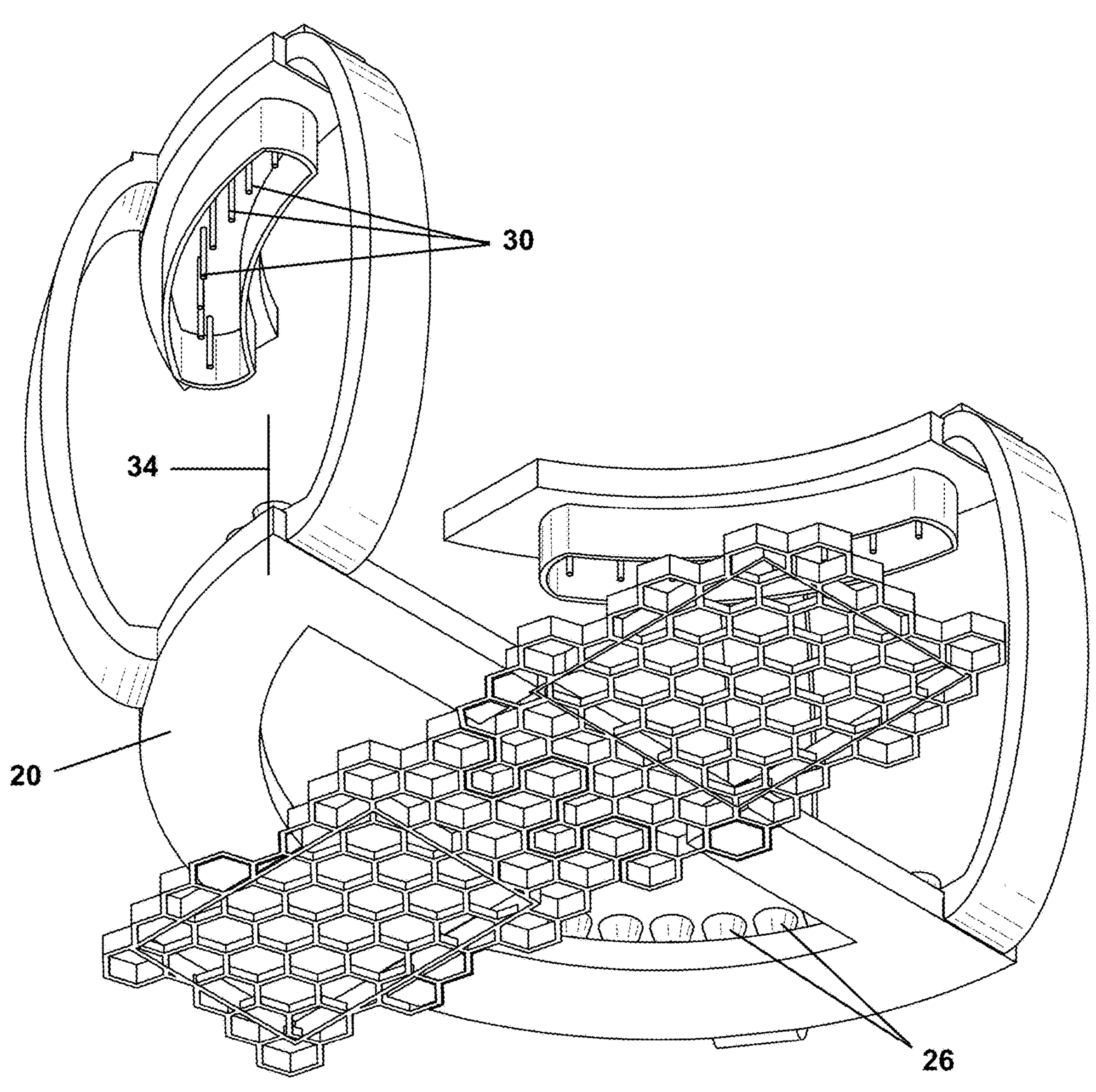
FIG. 3 is a perspective view of the platform and platform from below.

FIGS. 2 and 3 are perspective views of the platform 20 of the first embodiment with the robot arm 2, dispenser 24, and drawing implements 18 removed. The storage locations 26 are radially arrayed around the robot arm axis of rotation 8. The example of FIGS. 2 and 3 show sixteen storage locations 26 and can accommodate sixteen drawing implements 18; however, any number of storage locations 26 are contemplated by the Invention. FIGS. 2 and 3 show that the storage location longitudinal axes 34 are generally parallel to the robot arm axis of rotation 8. The ejecting pins 30 (FIG. 3) are supported by the platform 20 above and in a spaced-apart relation to the storage locations 26 and aligned with the corresponding storage location longitudinal axis 34. The ejecting pins 30 may be protected from damage by ejecting pin guards 36 defined by the platform 20.

Figures 4A, 4B:
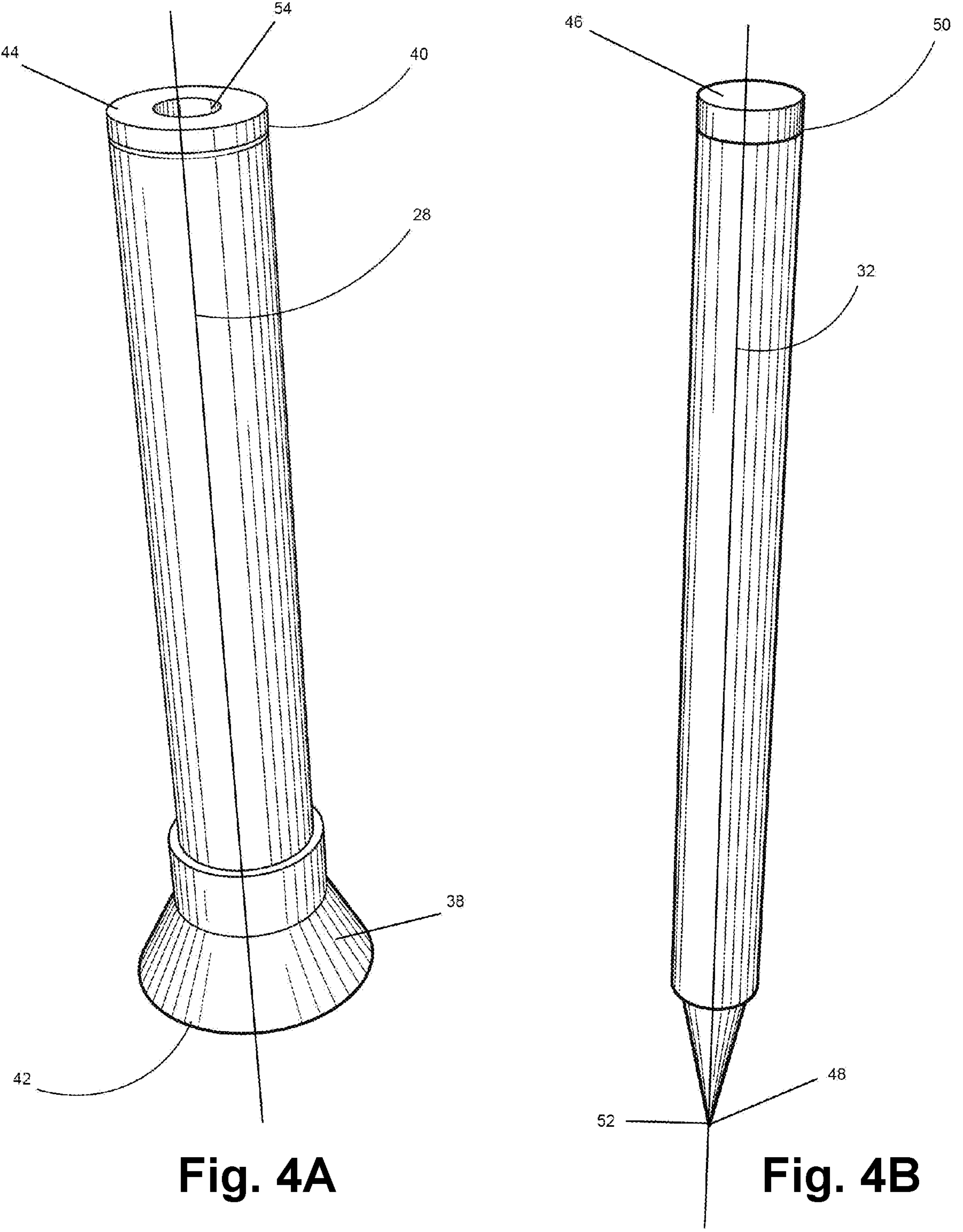
FIG. 4A is an isometric view of the holder.
FIG. 4B is an isometric view of a drawing implement.

FIGS. 4A and 4B show the holder 26 and drawing implement 18 of the first embodiment, respectively. From FIG. 4A, the holder 16 is in the shape a hollow cylinder having a holder first end 38, a holder second end 40 and a holder longitudinal axis 28. The holder 16 is configured to receive, retain, and release any of the plurality of drawing implements 18, one of which is shown by FIG. 4B. The configuration of the holder 16 to receive and retain the drawing implement 18 is that the holder first end 38 is flared or conical to accommodate initial misalignment of the drawing implement 18 and holder 16, that the holder interior volume is sized to receive the drawing implement 18 through a holder opening 42, and the presence of a holder magnetic element 44 located at the holder second end 40. When the holder 16 receives a drawing implement 18, the holder magnetic element 44 and a corresponding drawing implement magnetic element 46 attract, attaching the drawing implement 18 to the holder 16. The holder magnetic element 44 and the drawing implement magnetic element 46 define a pair of mutually attractive magnetic elements.

From FIG. 4B, each drawing implement 18 has a drawing element first end 48 and a drawing implement second end 50. A drawing implement longitudinal axis 32 extends between the first and second ends 48, 50. A drawing implement drawing tip 52 is disposed at the drawing implement first end 48. A drawing implement magnetic element 46 is disposed at the second end 50 for engagement with the holder magnetic element 44.

From FIGS. 4A and 4B, the pair of mutually attractive magnetic elements 44, 46 retaining the drawing implement 18 to the holder 16 may be a magnet and a ferrous object, or may be two magnets. The holder magnetic element 44 is penetrated by a hole 54 to allow separation of the two magnetic elements by an ejecting pin 30. Optionally, a spacer (not shown) may be disposed at the end of the drawing implement 18 or within the holder 16 at the holder second end 40. The spacer separates the two magnetic elements 44, 46 to regulate the attractive force between the two magnetic elements 44, 46 when the two magnetic elements 44, 46 are in magnetic engagement, to cushion the impact and lessen the noise when the two magnetic elements 44, 46 engage, and to ease separation of the two magnetic elements 44, 46.

FIGS. 5-13 show an example sequence of operations of the first embodiment of the system of the Invention. While example sequence of FIGS. 5-13 show the robot arm 2 and holder 16 picking up, using, and replacing the drawing implements 18 in a specific order, the robot arm 2, acting under the instruction of the microprocessor, may select any of the drawing implements 18 available to it and may pick up, use, and replace and drawing implements 18 in any order.

In the firsts step in the example sequence, which is not shown by FIGS. 5-13, the microprocessor causes the robot arm 2 to move the holder 16 to directly above a drawing implement 18 held in a storage location 26. The microprocessor causes the robot arm 2 to move in a downward direction parallel to the robot arm axis of rotation 8 so that the open holder first end 38 receives the second end 50 of a first drawing implement 18 and so that the drawing implement magnetic element 46 of the first drawing implement 18 engages the holder magnetic element 44, securing the first drawing implement 18 to the holder 16. The microprocessor then causes the robot arm 2 to move the first drawing implement 18 vertically upward to clear the storage location 26 and then to the substrate 22 in preparation for drawing on the substrate 22.

Figure 5:
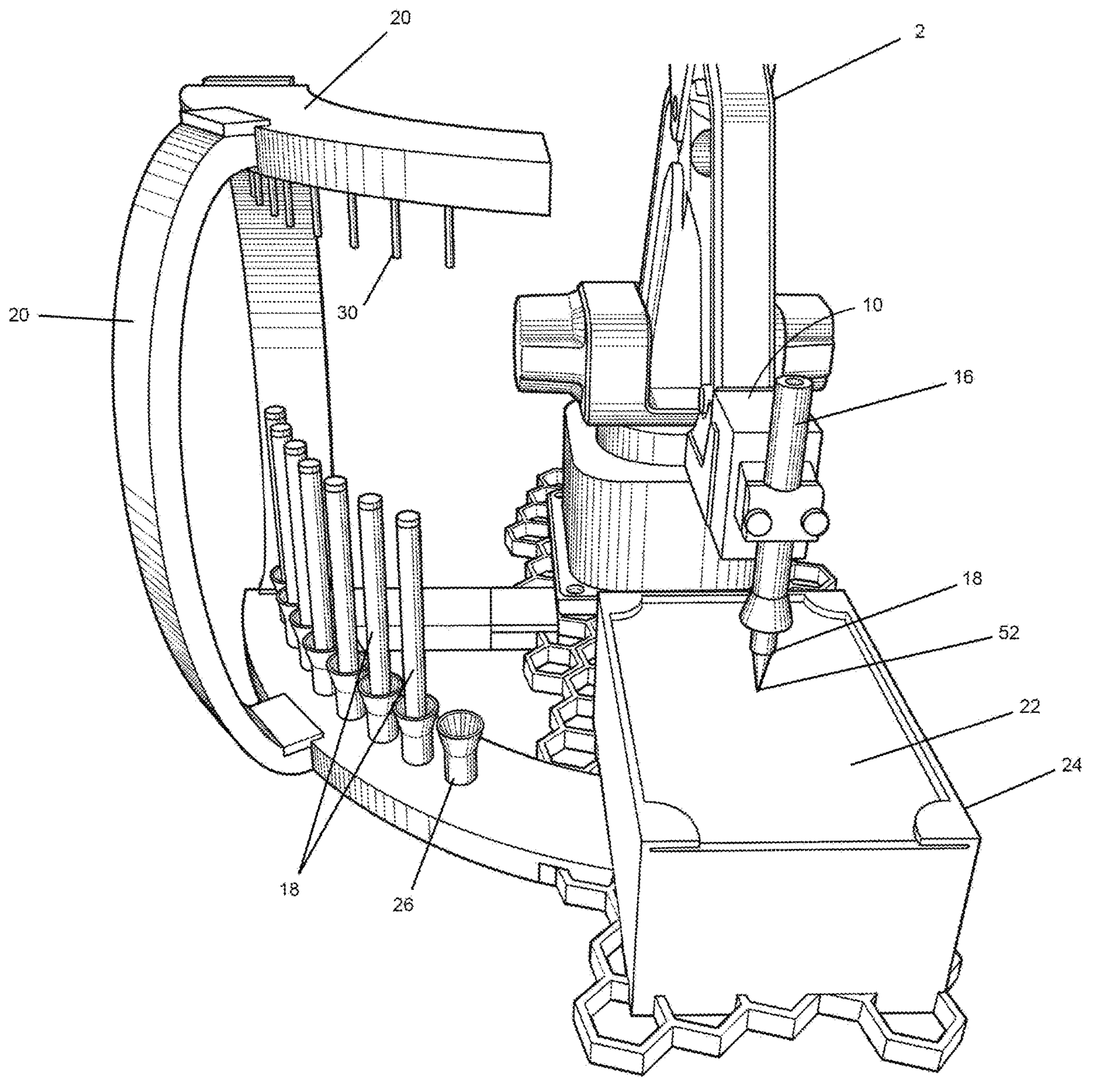
FIG. 5 is a perspective view of the system while drawing using a first drawing implement.

FIG. 5 picks up the example sequence with the robot arm 2 moving the first drawing implement 18 to draw upon a substrate 22 supported by a dispenser 24. The microprocessor causes the robot arm 2 to move the holder 16 and hence the drawing implement 18 along a pre-determined path in an X-Y coordinate plane while holding the drawing tip 52 in contact with the substrate 22.

Figure 6:
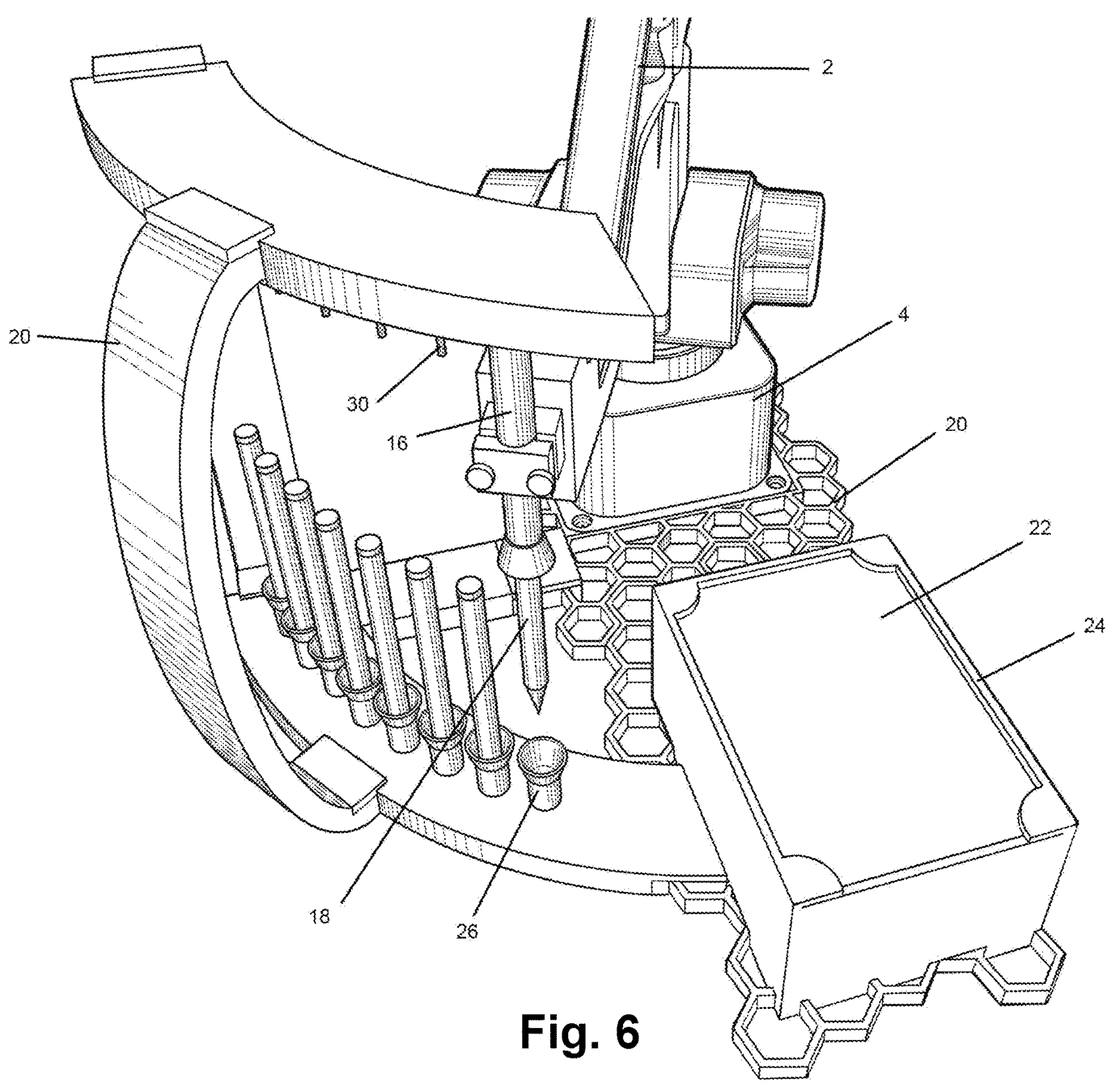
FIG. 6 is a perspective view of the system showing the robot arm ejecting the first drawing implement using a first ejecting pin.

FIG. 6 shows the step after FIG. 5. With drawing by the first drawing implement 18 completed, the microprocessor causes the robot arm 2 to move the holder 16 and the first drawing implement 18 to directly over the first storage location 26 and directly below the first ejecting pin 30. The microprocessor then causes the robot arm 2 to move the holder 16 directly upward parallel to the robot arm axis of rotation 8 and with the longitudinal axis of the ejecting pin 30 aligned with the holder longitudinal axis 28 and the storage location longitudinal axis 34. The relative movement between the holder 16 and the first ejecting pin 30 causes the first ejecting pin 30 to pass through the hole 54 penetrating the holder magnetic element 44 (shown by FIG. 4A). Continued movement of the holder 16 in the upward direction causes the pin 30 to push the drawing implement magnetic element 46 out of engagement with the holder magnetic element 44. The first drawing implement 18, no longer supported, falls due to the force of gravity so that the drawing element first end 52 drops into the first storage location 26. The first storage location 26 then supports the first drawing implement 18 in an upright position with the first drawing implement longitudinal axis 32 generally parallel to the robot arm axis of rotation 8, ready to be used again.

Figure 7:
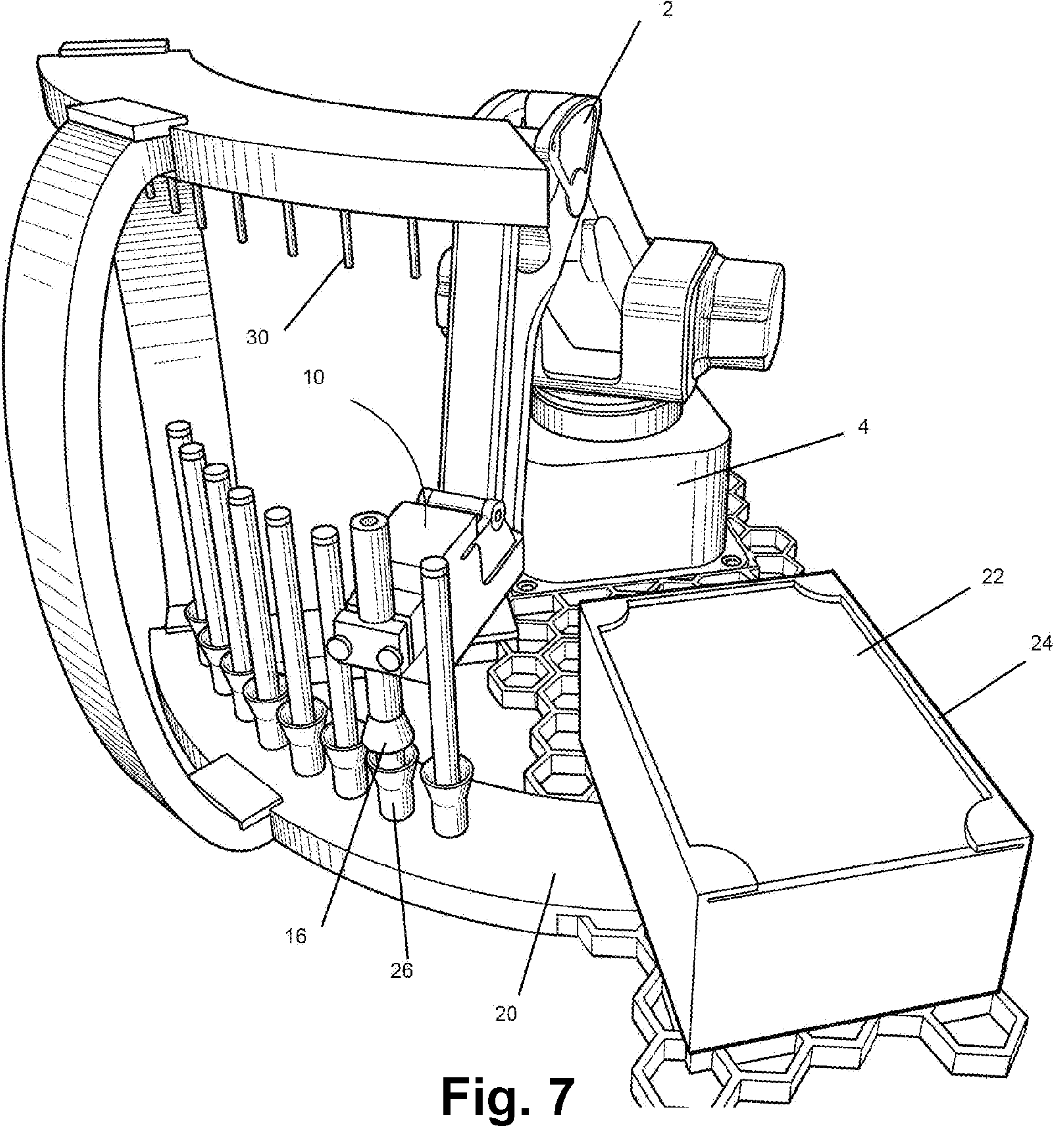
FIG. 7 is a perspective view of the robot arm picking up a second drawing implement using the holder.

FIG. 7 shows the system at a time immediately after that of FIG. 6. From FIG. 7, the microprocessor next causes the robot arm 2 to move the holder 16 to directly above a second drawing implement 18. The holder 16 moves vertically downward, parallel to the robot arm axis of rotation 8, until the second drawing implement second end 50 passes through the opening of the holder first end 38 and the second drawing implement magnetic element 46 engages the holder magnetic element 44, attaching the second drawing element 8 to the holder 16.

Figure 8:
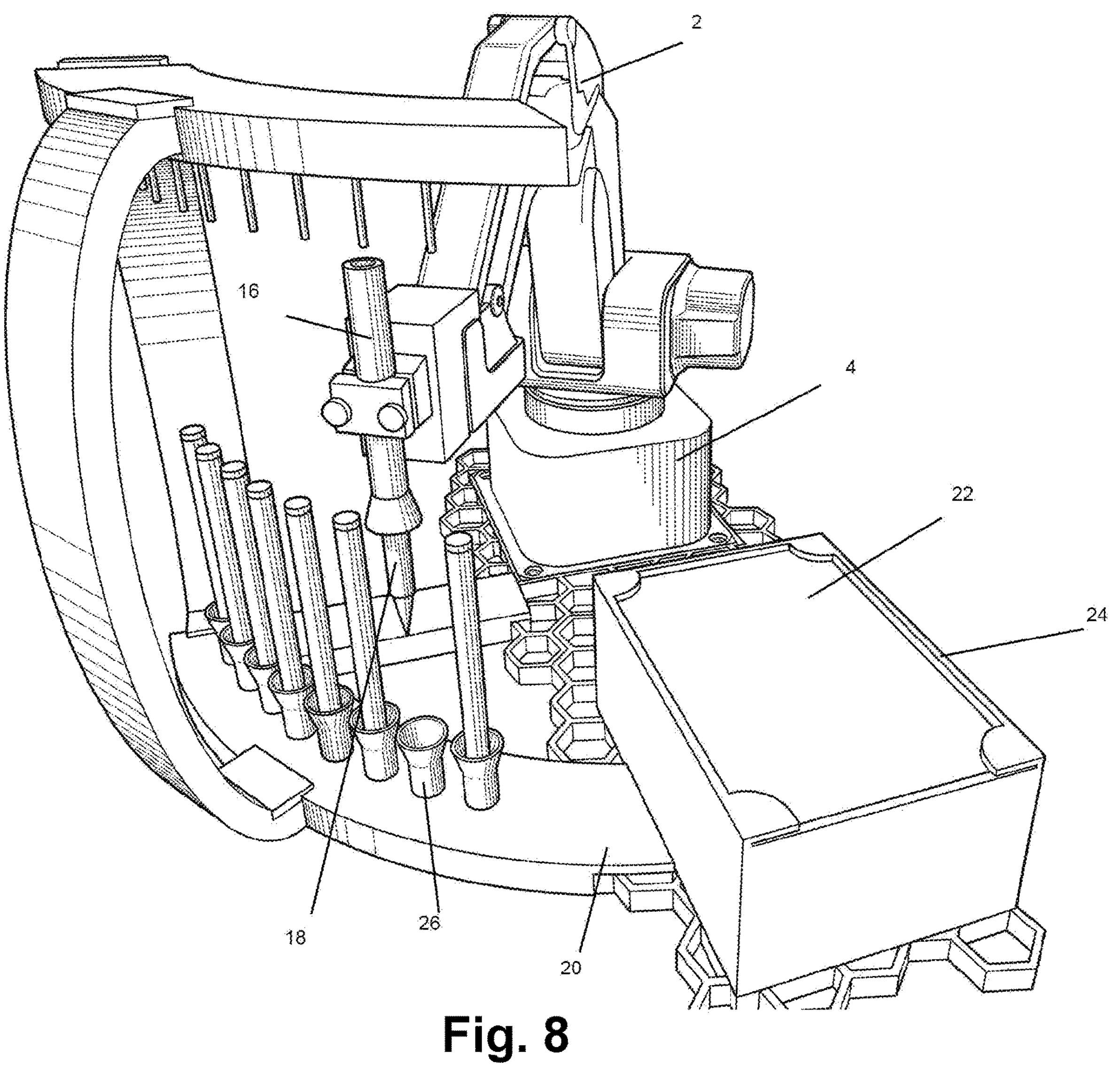
FIG. 8 is a perspective view showing the robot arm holding the second drawing implement and moving the second drawing implement toward the substrate.

From FIG. 8, which follows FIG. 7 in sequence, the robot arm 2 has picked up the second drawing implement 18 and moved the second drawing implement 18 to the substrate 22. The microprocessor causes the robot arm 2 to move the second drawing implement 18 in the X and Y axes with the drawing tip 52 in contact with the substrate 22 to draw upon the substrate 22. The second drawing implement 18 may be configured to make marks of a second color on the substrate 22, the second color being different from that of the first drawing implement 18. The second drawing implement 18 may provide a different line width, or technology, or any other different characteristic from that of the first drawing implement 18.

Figure 9:
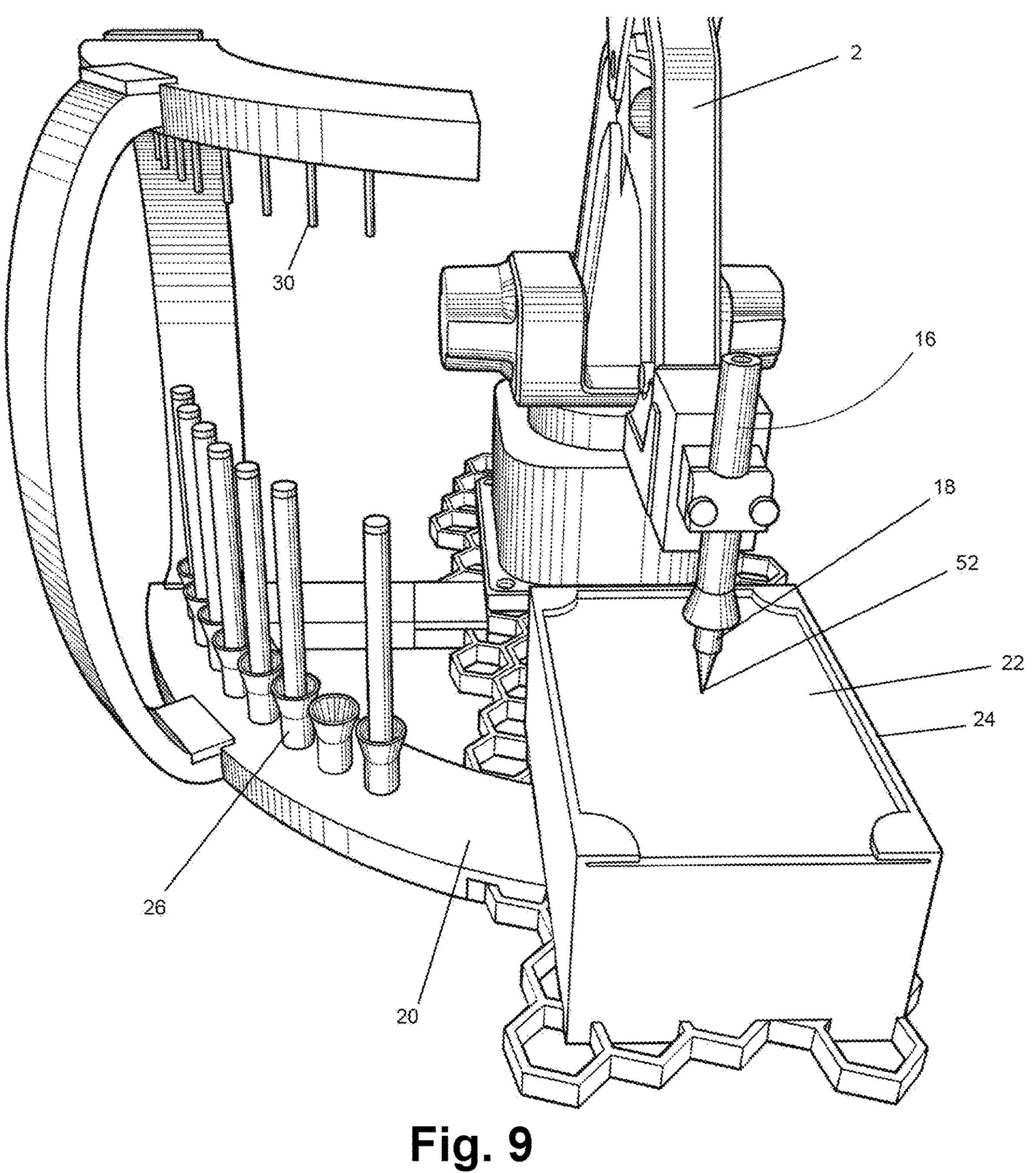
FIG. 9 is a perspective view showing the robot arm drawing on the substrate with the second drawing implement.
Figure 10:
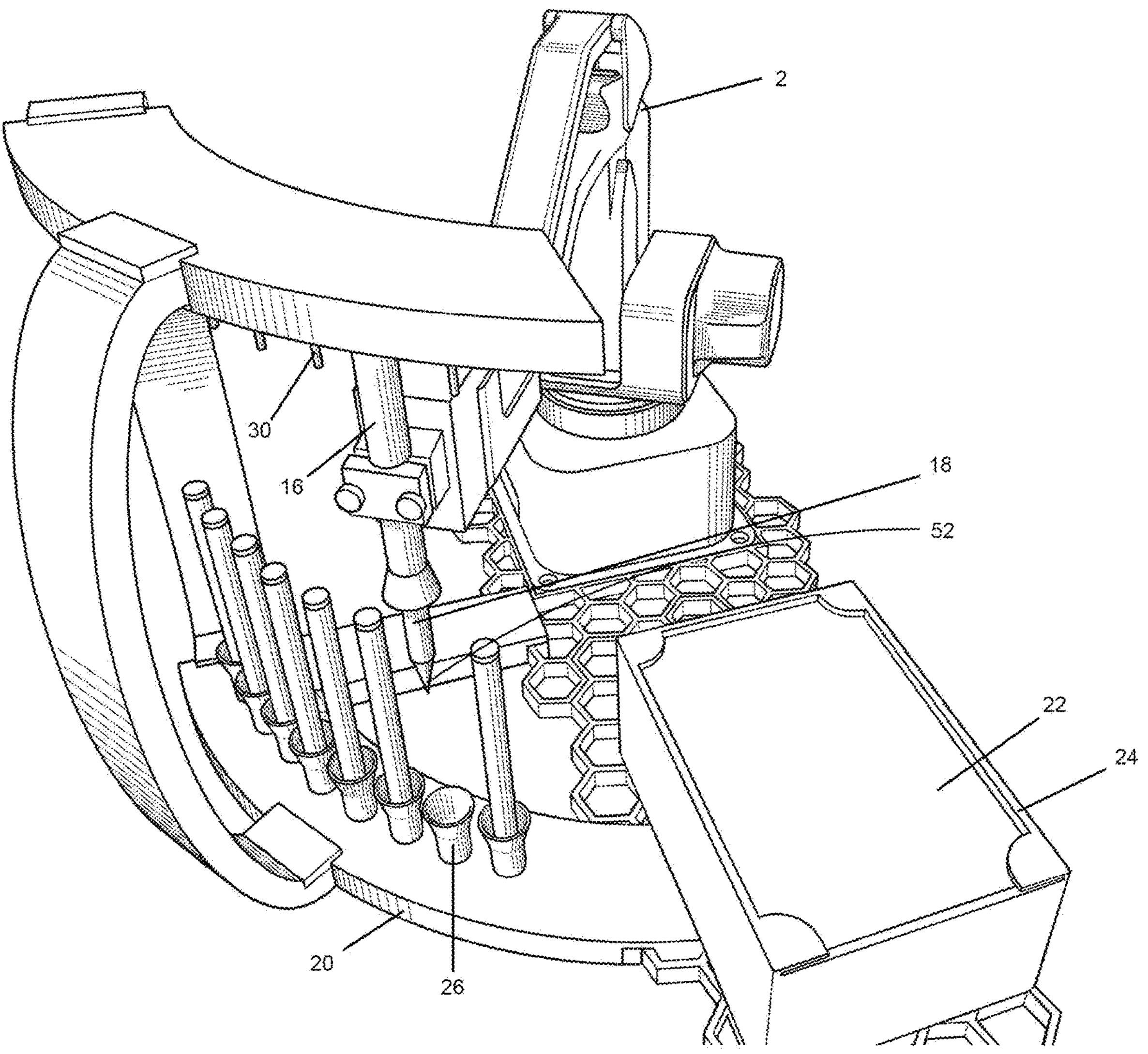
FIG. 10 is a perspective view showing the robot arm ejecting the second drawing implement from the holder using the second ejecting pin.
Figure 11:
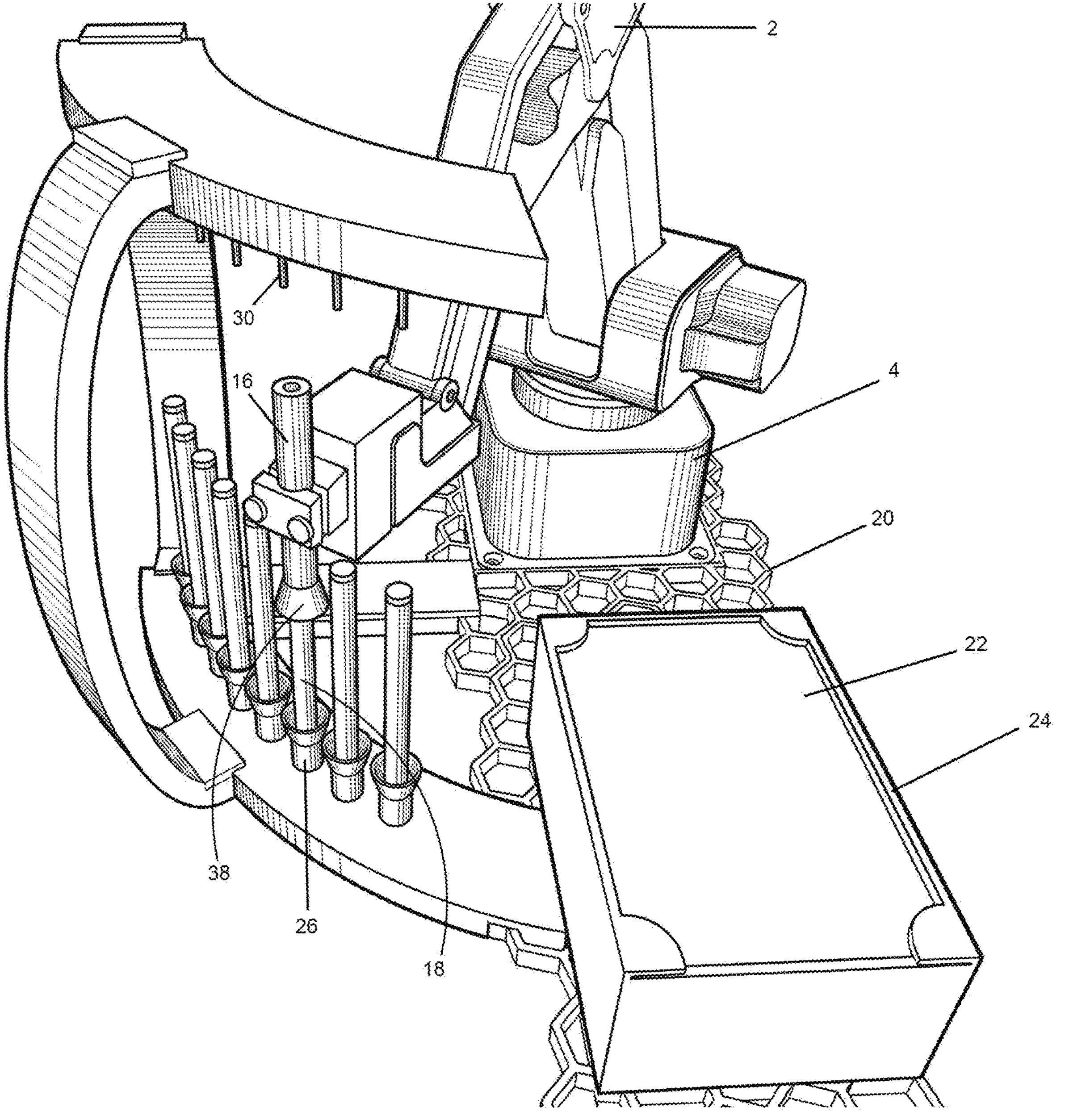
FIG. 11 is a perspective view showing that the second drawing implement is ejected from the holder and has fallen into the second storage location, and the robot arm is picking up a third drawing implement.
Figure 12:
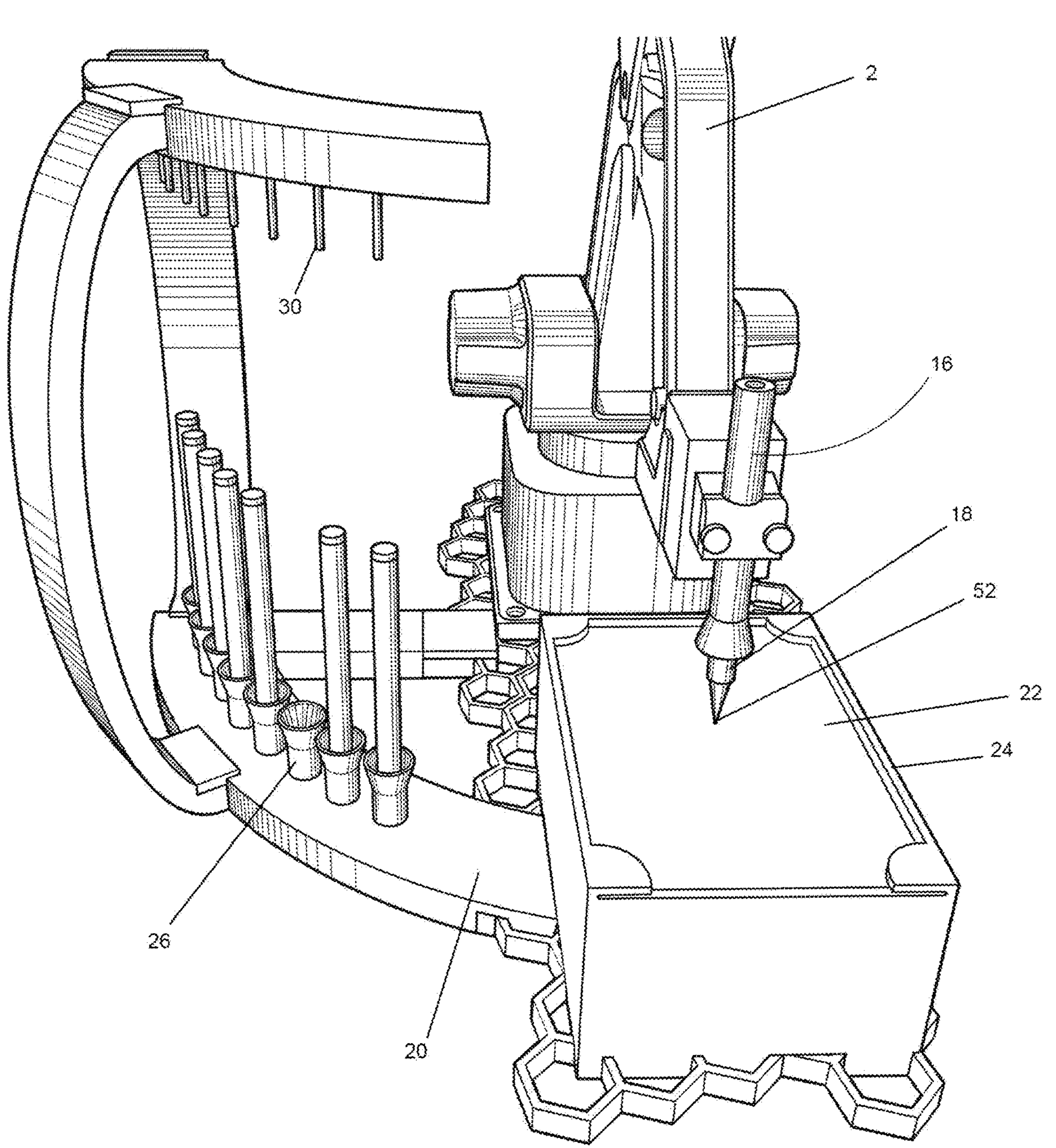
FIG. 12 is a perspective view showing the robot arm drawing with the third drawing implement.

From FIG. 10, which follows FIG. 9 in the sequence, and similar to the discussion of FIG. 6 above, the robot arm 2 moves the second drawing implement 18 to directly above the second storage location 26 and moves the holder 16 upwards so that the ejecting pin 30 that is directly above the second storage location 26 presses the second drawing implement 18 out of engagement with the holder 16. The second drawing implement 18 falls into the second storage location 26 so that the drawing implement longitudinal axis 32 of the second drawing implement 18 is parallel to the robot arm axis of rotation 8. The second drawing implement 18 is now ready for reuse.

Figure 13:
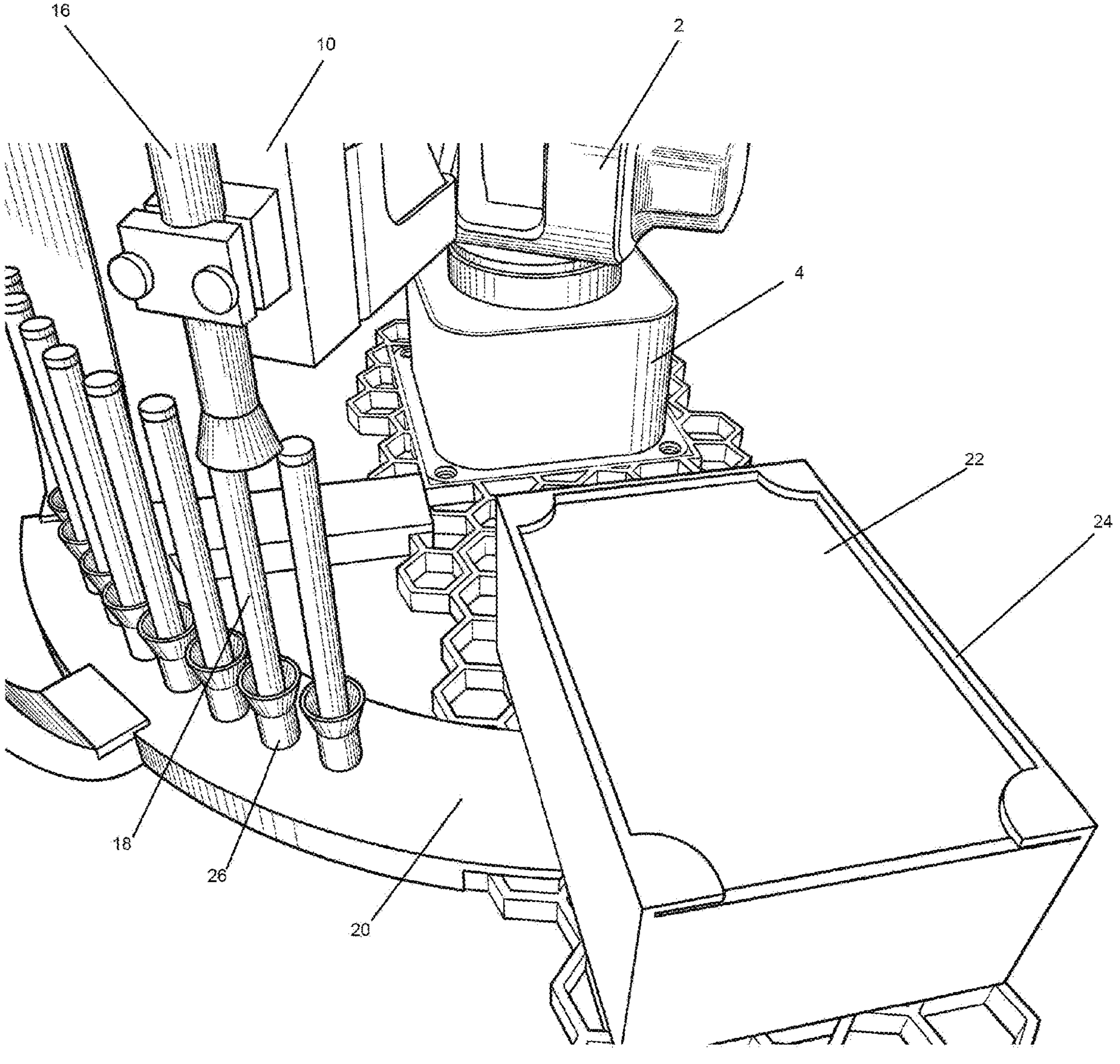
FIG. 13 is a perspective view showing the finished drawing, ready to be dispensed from the dispenser.
Figure 14:
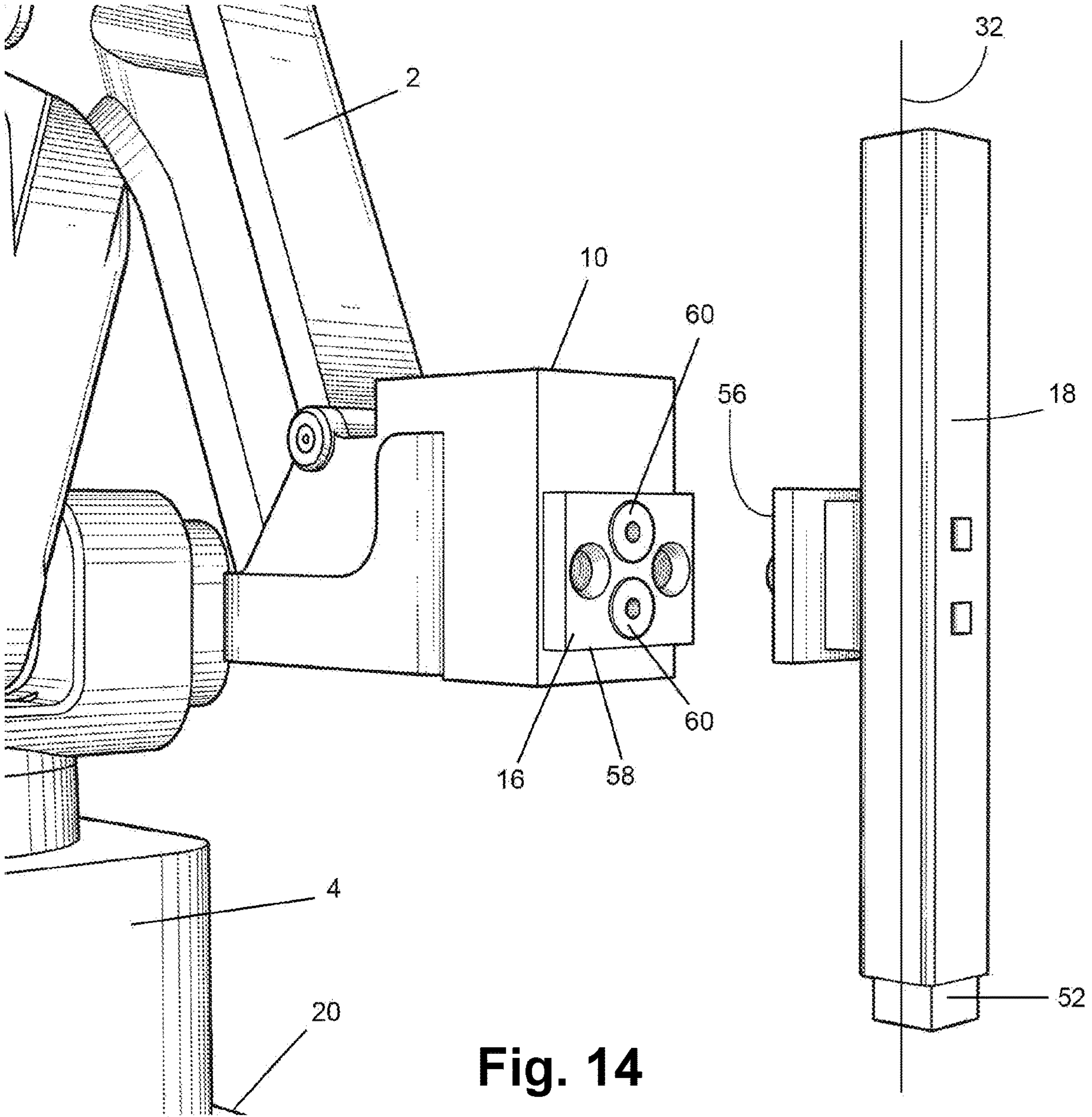
FIG. 14 is a perspective view of the robot arm and drawing implement of the second embodiment.
Figure 15:
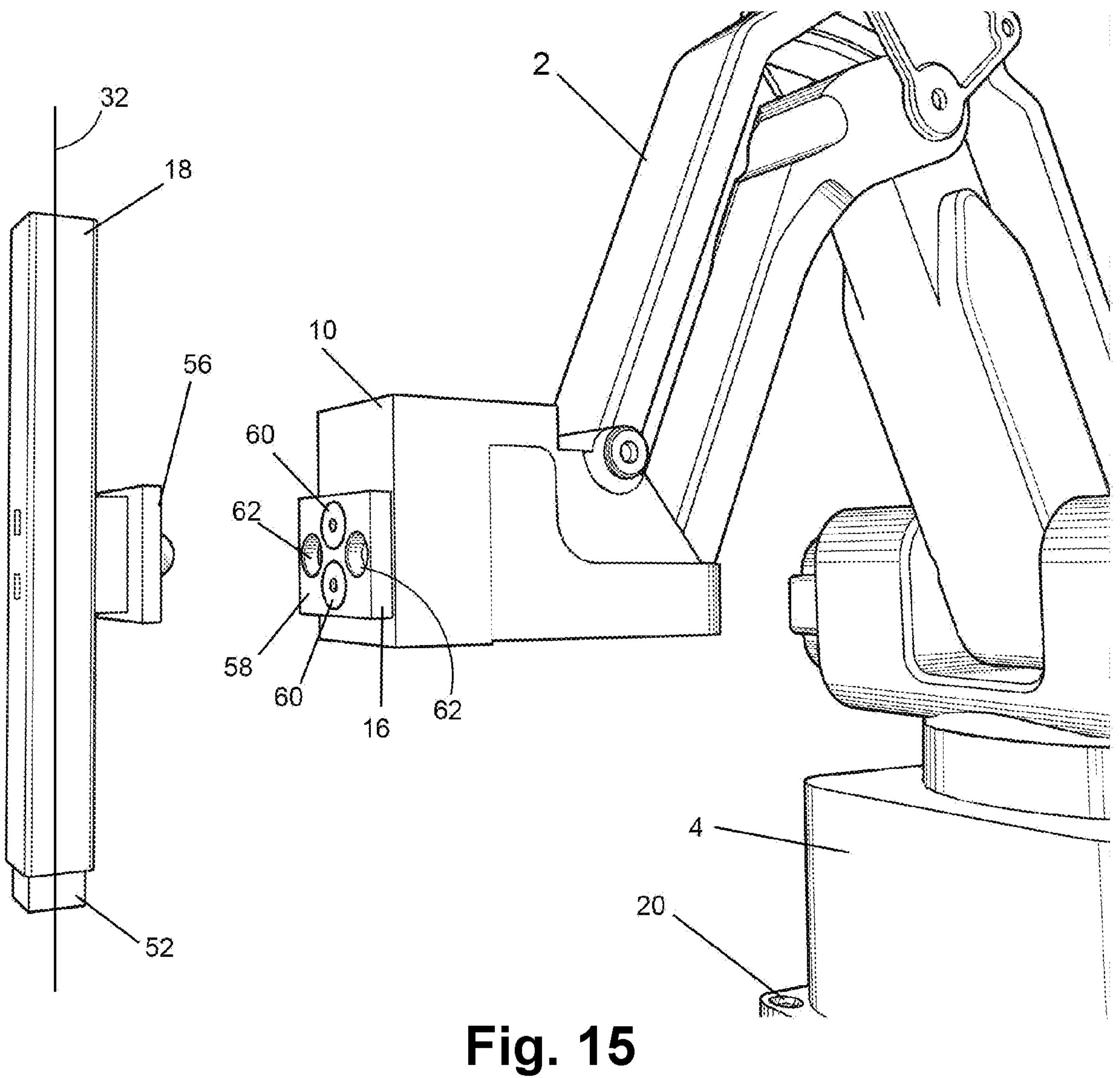
FIG. 15 is a perspective view of the robot arm and drawing implement of the second embodiment.
Figure 16:
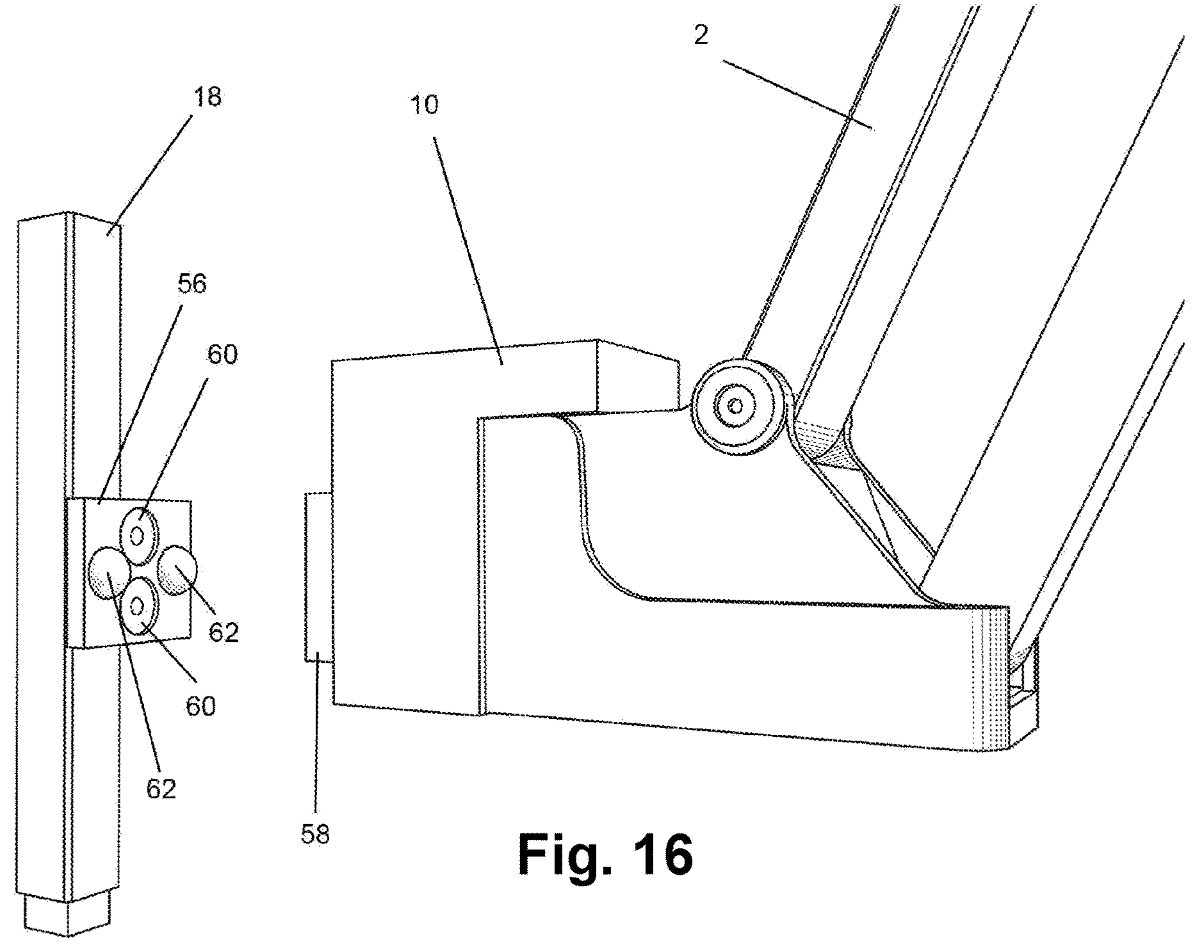
FIG. 16 is a perspective view of the robot arm and drawing implement of the second embodiment.
Figure 17:
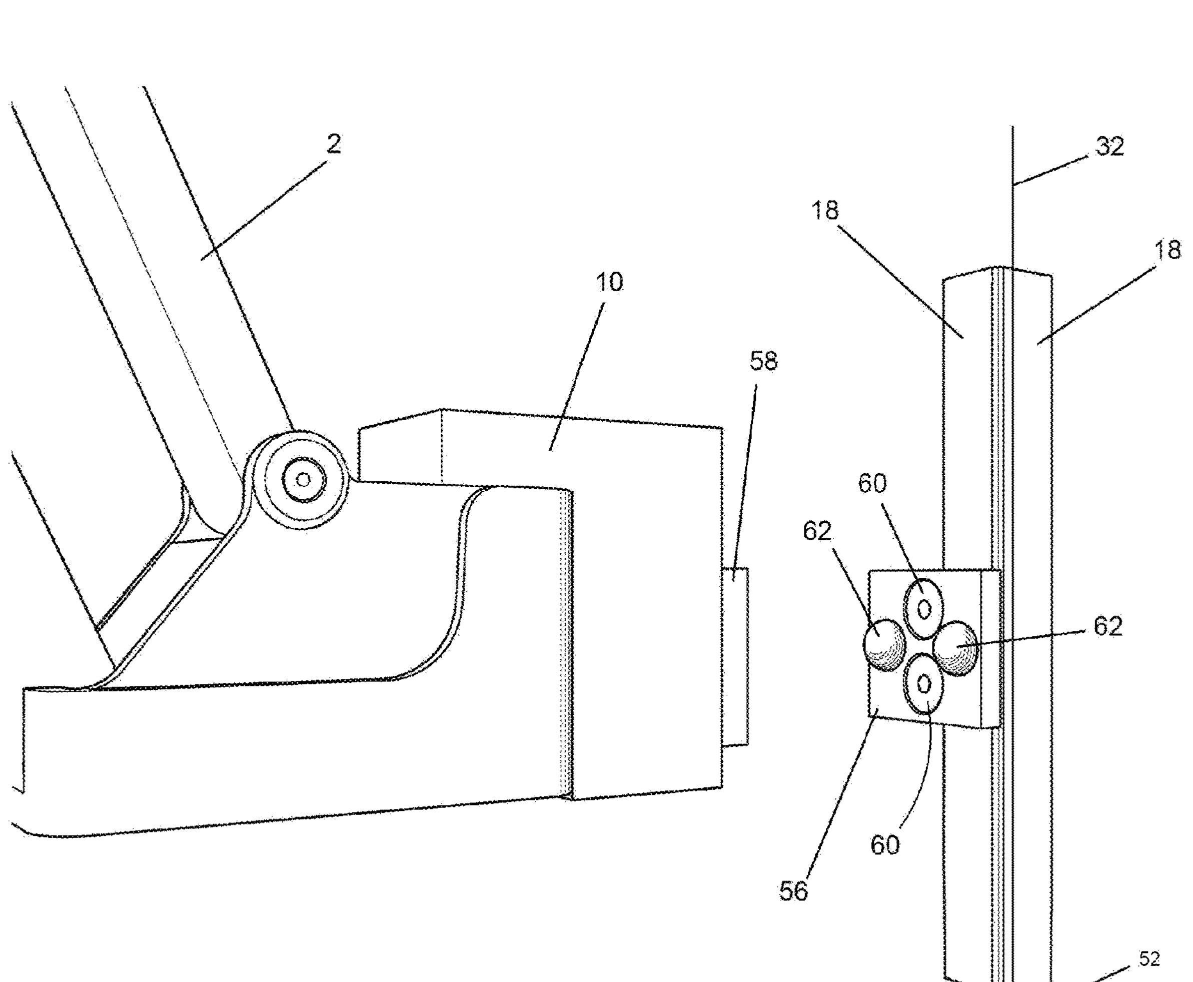
FIG. 17 is a perspective view of the robot arm and drawing implement of the second embodiment.

The microprocessor causes the robot arm to follow the above sequence for additional drawing implements 18 until the drawing is completed. FIG. 13 shows the substrate 22 exhibiting the completed drawing, ready to be dispensed from the dispenser 24.

FIGS. 5-13 show eight storage locations 26 that may contain eight drawing implements 18 available for selection by the microprocessor. Alternatively, any number of storage locations 26 and drawing implements 18 may be accommodated by the platform 20. Rather than a single row of drawing implements 18 and a single row of ejecting pins 30 radially disposed about the robot arm robot arm axis of rotation 8 on one side of the dispenser 24, the platform 20 may support more than one row of drawing implements 18, with the rows differing in radial distance to the robot arm robot arm axis of rotation 8.

Alternatively, the storage locations 26 and drawing implements 18 may be located other than radially with respect to the base 4. Because the robot arm 2 is movable in three dimensions, the storage locations 26 and ejecting pins 30 may be located in any arrangement, so long as the robot arm 2 may manipulate the holder to engage the drawing implements 8 and, for the first embodiment, so long as the robot arm 2 may engage the ejecting pins 30 to release the drawing implements 8 and to drop the drawing implements 8 into the storage locations 26.

As shown by FIGS. 2 and 3, the platform 20 may extend to the opposite side of the dispenser 24 and robot arm 2. The extended platform 20 may be a mirror image of the platform 20 shown by FIGS. 5-13. The storage locations 26, drawing implements 18, and ejecting pins 30 function in the same manner as described above for the platform 20 of FIGS. 5-13.

FIGS. 14 through 18 illustrate a second embodiment of the robot arm 2, holder 16, and drawing implement 18. From FIGS. 14-18, and for the second embodiment, each drawing implement 18 has an implement engagement surface 56 disposed on a side of the drawing implement 18. The implement engagement surface 56 maybe substantially parallel to the drawing implement longitudinal axis 32 and in a spaced-apart relationship with the drawing implement longitudinal axis 32. The implement engagement surface 56 is configured for selectable engagement with a robot arm engagement surface 58 forming the holder 16 attached to the robot arm 2. The robot arm engagement surface 58 is disposed at the operating end 10 of the robot arm 2 and is oriented radially away from the robot arm axis of rotation 8. In use, the implement engagement surface 56 of each drawing implement 18 in each storage location 26 is oriented radially toward the robot arm axis of rotation 8 and in a spaced-apart relation to the robot arm robot arm axis of rotation 8.

In the second embodiment, the implement engagement surface 56 and the robot arm engagement surface 58 include corresponding magnetic features 60 that magnetically attract the drawing implement 18 to the robot arm 2 when the implement engagement surface 56 and the robot arm engagement surface 58 are engaged. The implement engagement surface 56 and the robot arm engagement surface 58 also include corresponding physical features 62 that mate to prevent rotation of the implement engagement surface 56 with respect to the robot arm engagement surface 58 in a direction normal to the radial movement of the robot arm 2 when the implement engagement surface 56 and the robot arm engagement surface 58 are engaged. For example, the robot arm engagement surface 56 or the implement engagement surface 58 may include one or more physical shapes 62 such as pins, cones, spherical sections, pyramids, irregular shapes, curved shapes, or any other shapes that extend from the surface of the implement engagement surface 56 or robot arm engagement surface 58 and that engage with corresponding depression shapes 62 in the surface of the other of the robot arm engagement surface 58 or the implement engagement surface 56.

In use, a drawing implement of the second embodiment may be disposed in a tubular storage location 26 (shown by FIG. 18) radially disposed from the robot arm axis of rotation 8. The microprocessor will cause the robot arm 2 to rotate about the robot arm axis of rotation 8 until the radial location of the robot arm engagement surface 58 corresponds to the radial location of the implement engagement surface 56. The microprocessor will also cause the robot arm 2 to move so that the location of the robot arm engagement surface 58 along parallel to the robot arm axis of rotation 8 corresponds to the location of the implement engagement surface 56 along the robot arm axis of rotation 8. The microprocessor will cause the robot arm 2 to move radially away from the robot arm axis of rotation 8 until the robot arm engagement surface 58 physically engages the implement engagement surface 56. The corresponding magnetic features 60 of the implement engagement surface 56 and the robot arm engagement surface 58 mutually attract, securing the drawing implement to the robot arm and engaging the corresponding shapes of the robot arm engagement surface 58 and the implement engagement surface 56. The robot arm 2 will move the robot arm engagement surface 58 vertically until the drawing implement 18 clears the tubular storage location 26. The microprocessor will cause the robot arm 2 to move the drawing implement 18 to the substrate 22 and will cause the drawing implement 18 to make marks on the substrate 22.

When the microprocessor is finished with the drawing implement 18, it will cause the robot arm 2 to return the drawing implement 18 to the tubular storage location 26 or to another tubular storage location 26 that is not occupied by another drawing implement 18. To release the drawing implement 18 from the robot arm 2, the robot arm 2 will move the robot arm engagement surface 58 radially toward the robot arm axis of rotation 8. The tubular storage location 26 will resist movement of the drawing implement 18 in the radial direction 14 until the force exerted by the robot arm 2 exceeds the force of the magnetic attraction, releasing the drawing implement 18 from the robot arm 2. The microprocessor may cause the robot arm 2 to engage another drawing implement 18.

Figure 18:
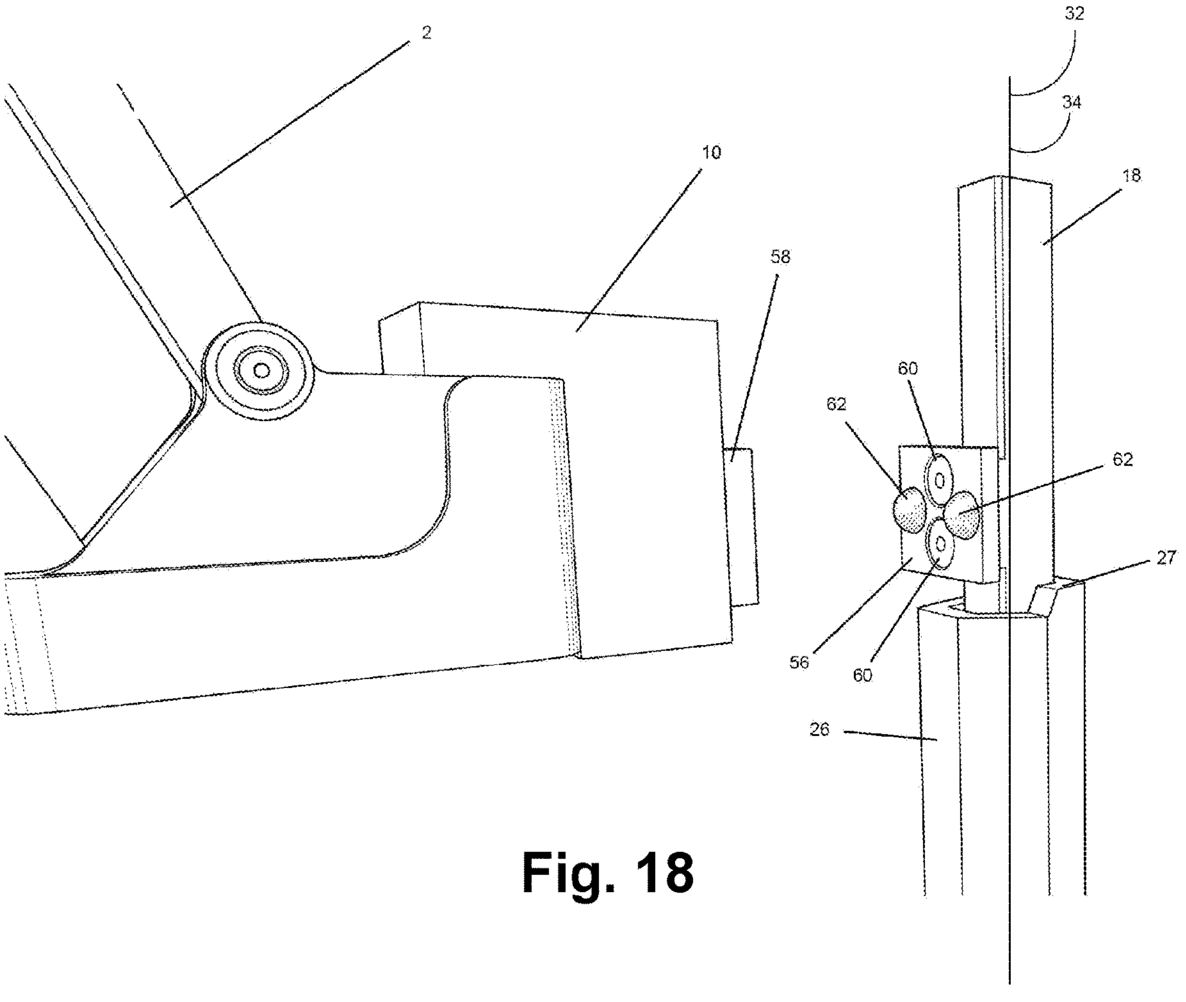
FIG. 18 is a perspective view of the robot arm, drawing implement, and storage location of the second embodiment.
Figure 19:
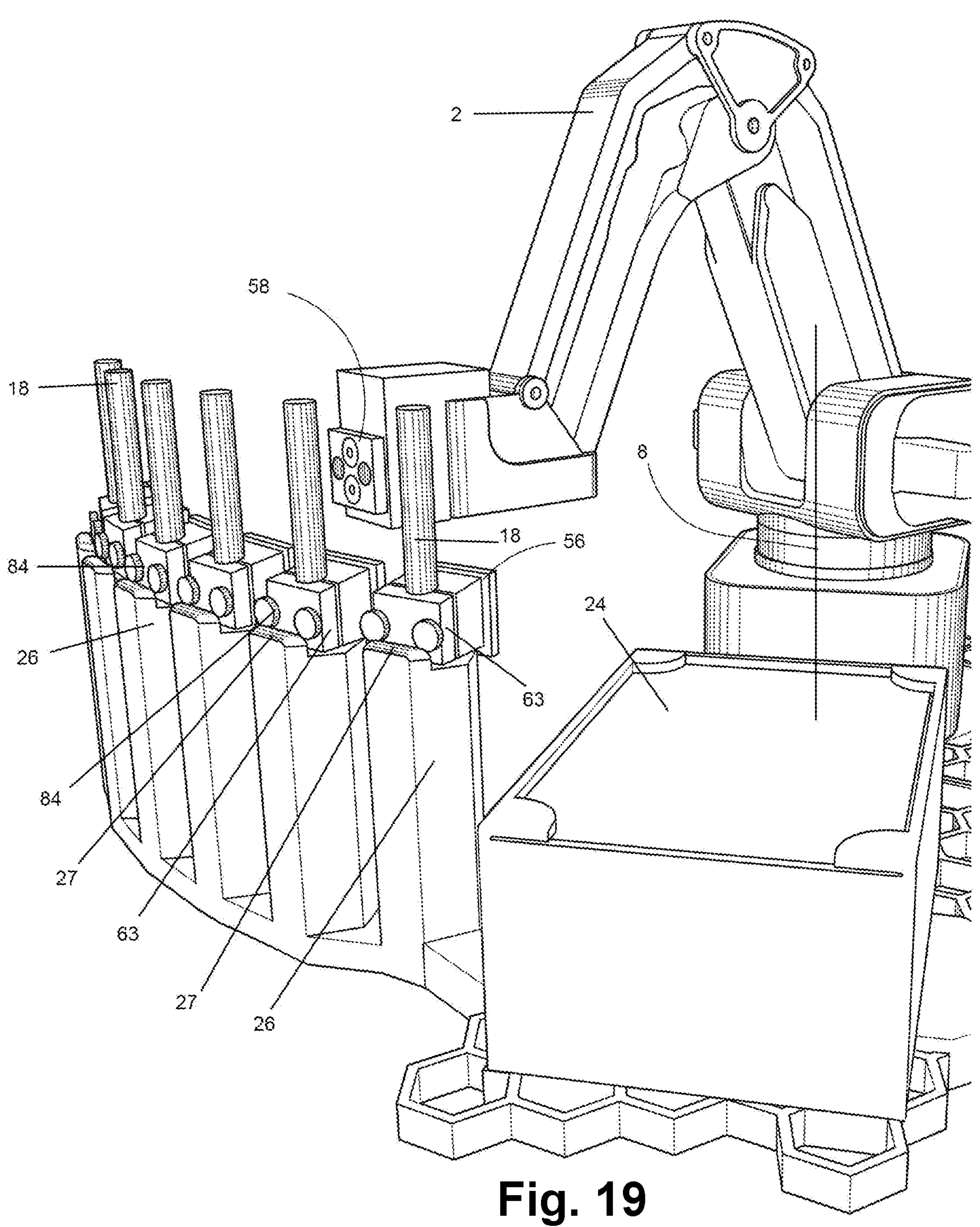
FIG. 19 is a perspective detail view of the robot arm, drawing implement, clamp, backstop and dispenser of the second embodiment.
Figure 20:
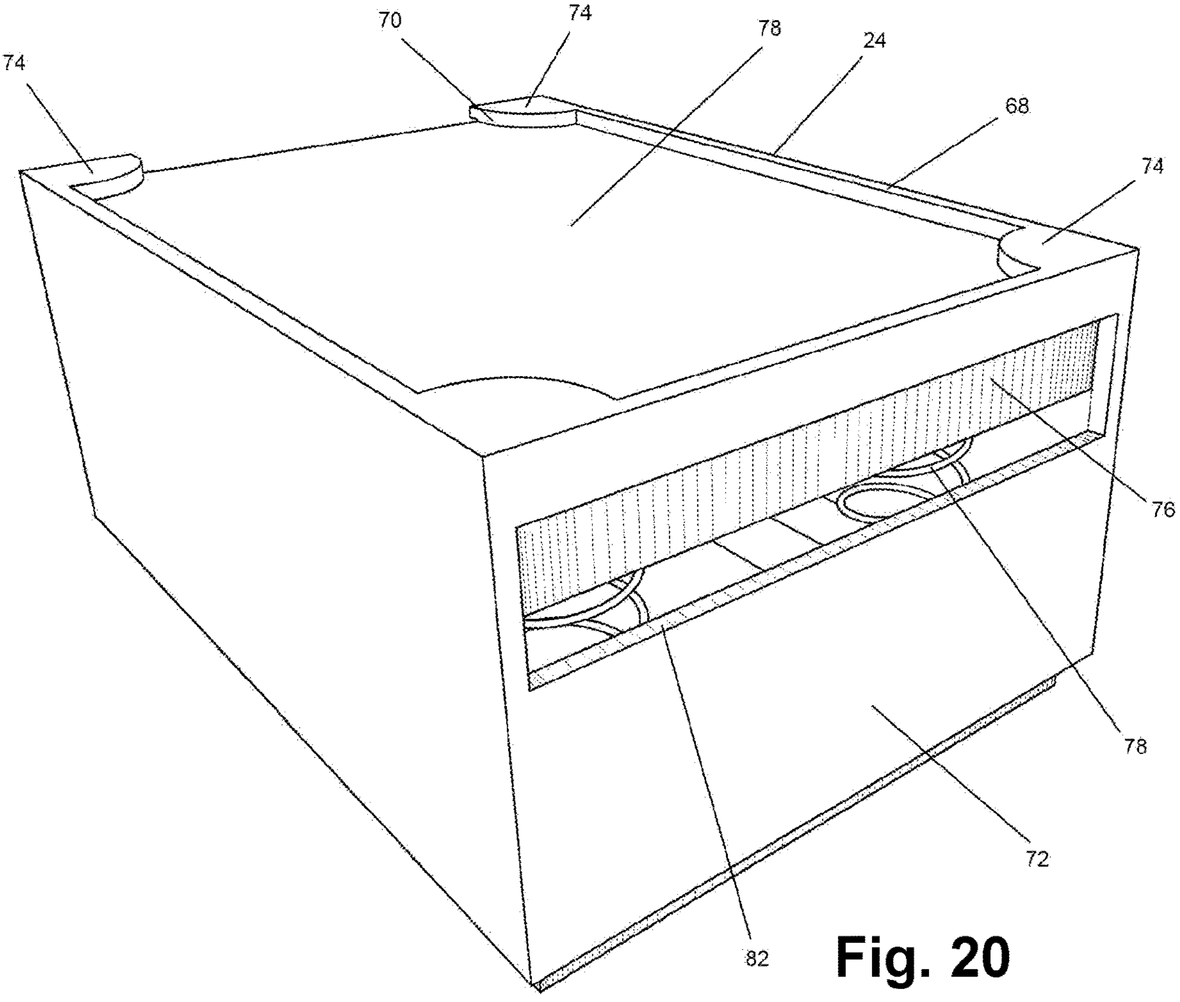
FIG. 20 is a perspective view of the dispenser from above.
Figure 21:
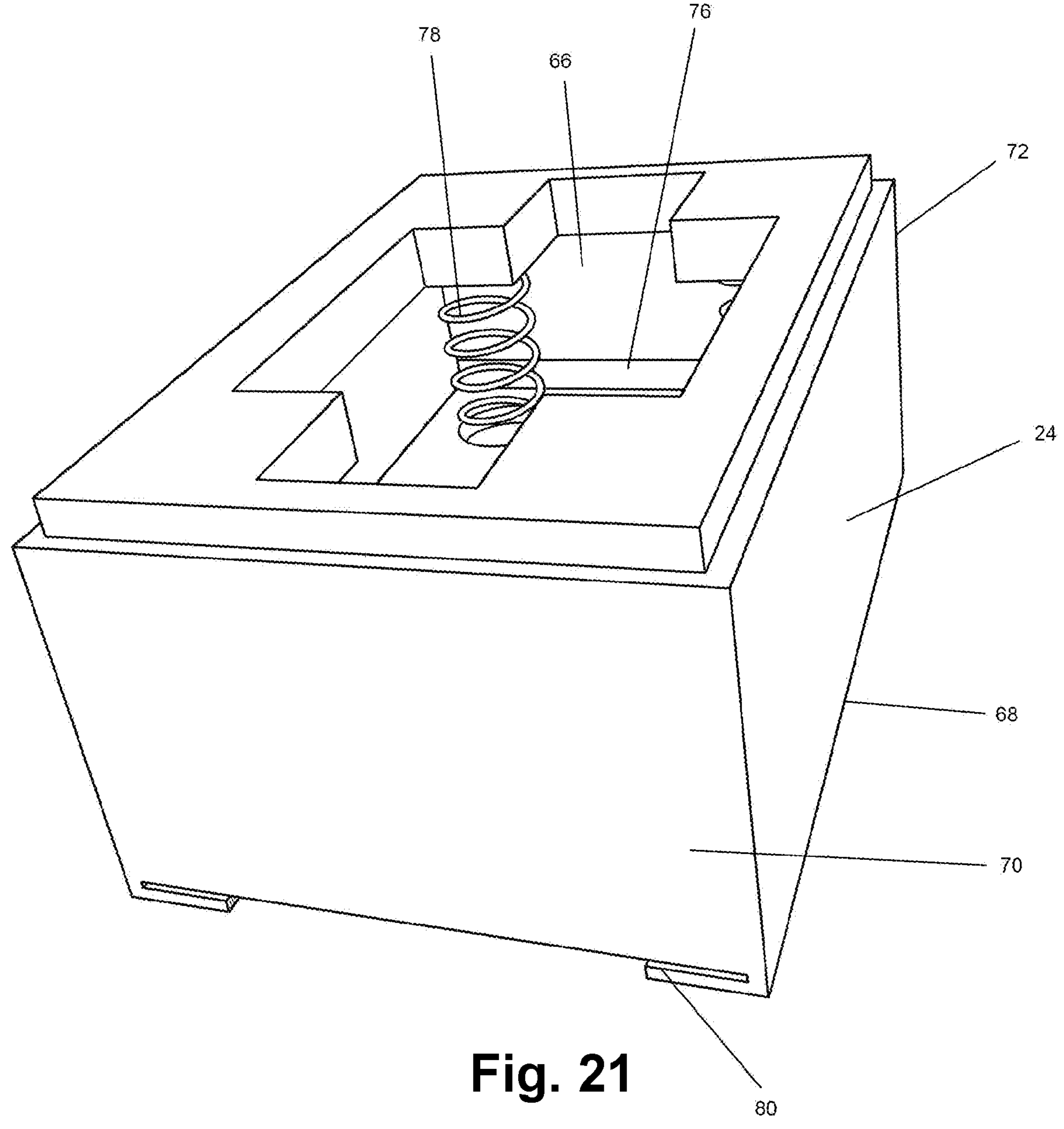
FIG. 21 is a perspective view of the dispenser from below.

From FIGS. 18 and 19, the tubular storage location 26 of the second embodiment may include a backstop 27. The backstop 27 orients the implement engagement surface 56 toward the robot arm axis of rotation 8 so that each implement engagement surface 56 will correctly engage the robot arm engagement surface 58. The backstop 27 also prevents the magnetic field of the robot arm engagement surface 60 from interfering with other drawing implements 18 as the robot arm engagement surface 58 passes by on its way to or from a selected implement 18.

From FIG. 19, the implement engagement surface 56 may be attached to a removable clamp 63. The clamp 63 releasably attaches to a drawing implement 18, such as a pencil, pen, marker or any other drawing implement 18 as defined herein. When the clamp 63 engages the drawing implement 18 and the drawing implement 18 is stored in the tubular storage location 26, the clamp 63 engages the backstop 27 to orient and locate the implement engagement surface 56 toward the robot arm axis of rotation 8. Any suitable corresponding physical features of the tubular storage locations 26 and the clamps 63 to locate the implement engagement surface 56 with respect to the robot arm 2 are contemplated by the invention, such as pins, sockets, wedges, angular or stepped shapes, and all are included in the definition of 'backstop' 27 as used in this document.

Other than the connection and disconnection of the drawing implement 28 from the robot arm 2, this second embodiment operates in the same manner as the first embodiment.

For either embodiment, the system of the Invention will include a platform 20, shown by FIGS. 2 and 3. The platform 20 locates the robot arm base 4 and the substrate 22 in three-dimensional space relative to each other and hence allows the robot arm 2 under the control of the microprocessor to locate those elements. The platform 20 locates the storage locations 26 (and hence the drawing implements 18) in three-dimensional space with respect the robot arm base 4 and the substrate 22. The platform 22 may include features such as fasteners, pins, clips, sockets or walls to fix the robot arm base 4, platform 20, storage locations 26, ejecting pins 30 and substrate 22 in their reference locations.

FIGS. 20-23 show the dispenser 24. Dispenser 24 includes a dispenser body 64 that has a dispenser body length and width and that defines a dispenser internal volume 66. The dispenser body 64 defines a dispenser top side 68, a first end 70 and a second end 72. The dispenser body 64 at the dispenser top side 68 is open to the dispenser internal volume 66 and includes a top side stop 74. The dispenser top side stop 74 prevents a dispenser pressure plate 78 from exiting the dispenser internal volume 66 through the dispenser open top side 68. The dispenser top side stop 74 also retains a stack of substrate 22 within the dispenser internal volume 66 and on top of the dispenser pressure plate 76 when the stack of substrate 22 is contained within the dispenser internal volume 66.

At least one spring 78 urges the pressure plate 76 against a stack of the substrate 22 and urges the stack of the substrate 22 against the dispenser top side stop 74. The spring 78 holds the pressure plate 76 and one or more of the substrates 22 in position on the platform 20. When a substrate 22 is disposed between the pressure plate 76 and the dispenser stop 74, the robot arm 2 can use a drawing implement 18 to draw upon the substrate 22 through the open top side 68 of the dispenser 24.

The dispenser 24 not only holds and dispenses the substrate 22, but also allows the system and apparatus of the Invention to accommodate differences in pressure applied to the substrate 22 by the robot arm 2 when the robot arm 2 places a drawing implement 18 in contact with the substrate 22. The pressure on the substrate 22 is defined by the spring(s) 78, not by the robot arm 2, allowing the robot arm 2 to be less precise, and hence less costly, than would otherwise be required.

The dispenser 24 includes a dispensing slot 80 located at the first end 70 of the dispenser 24. The dispensing slot 80 communicates through the dispenser body 64 from the dispenser internal volume 66 and is located immediately below the dispenser stop 74. The dispensing slot 80 has a length and width adequate to allow a substrate 22 to pass through the dispensing slot 80.

In use, a user will engage the top substrate 22 in a stack of the substrate 22 through the open dispenser top side 68 with the user's finger and will slide the top substrate 22 through the dispensing slot 80. Alternatively, the robot arm 2 under the control of the microprocessor may dispense the substrate 22 through the dispensing slot 80 by picking up a friction member and moving the friction member to engage the substrate and to push the substrate 22 through the dispensing slot 80.

Figure 22:
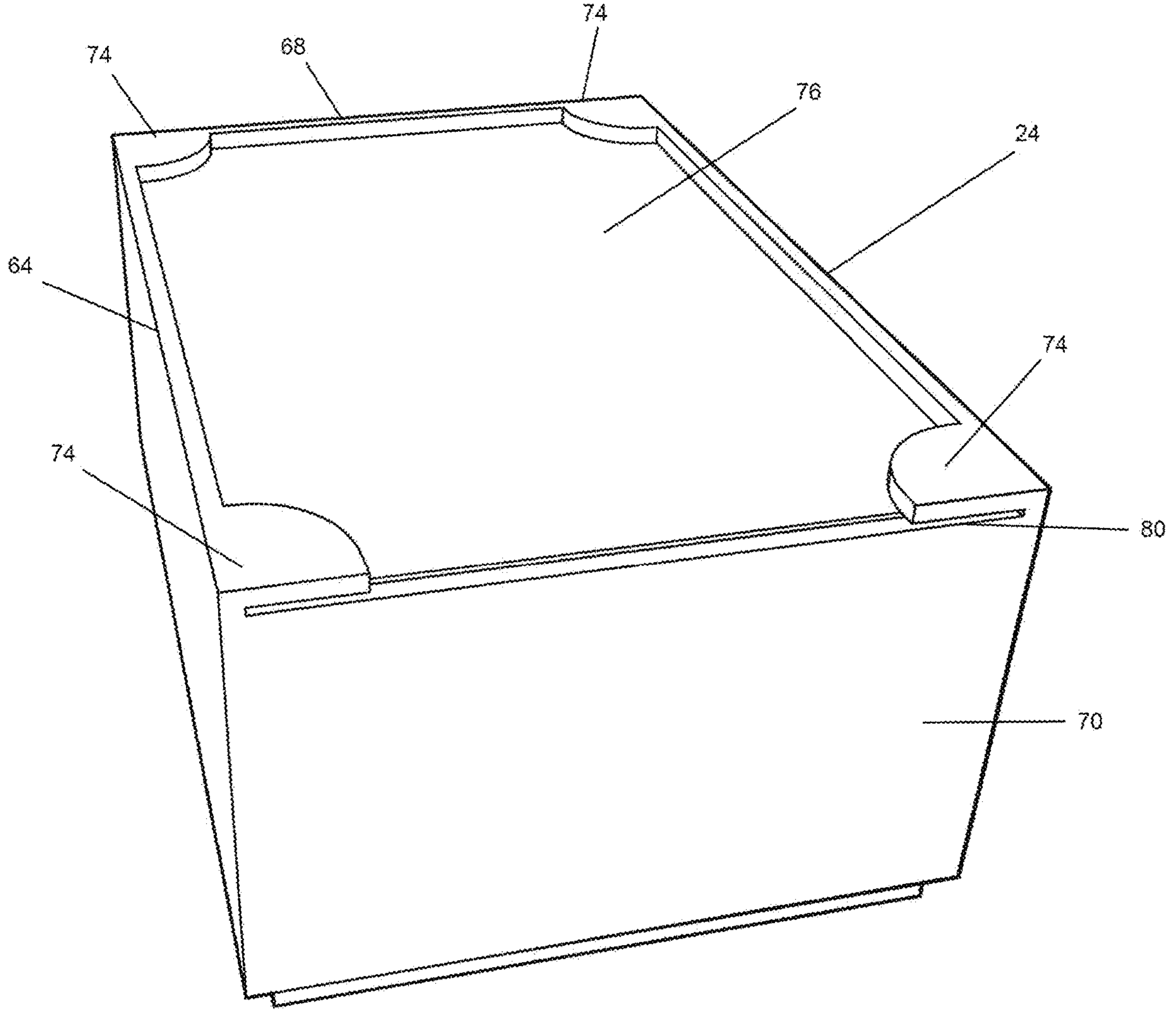
FIG. 22 is a perspective view off the dispenser showing the dispensing slot.
Figure 23:
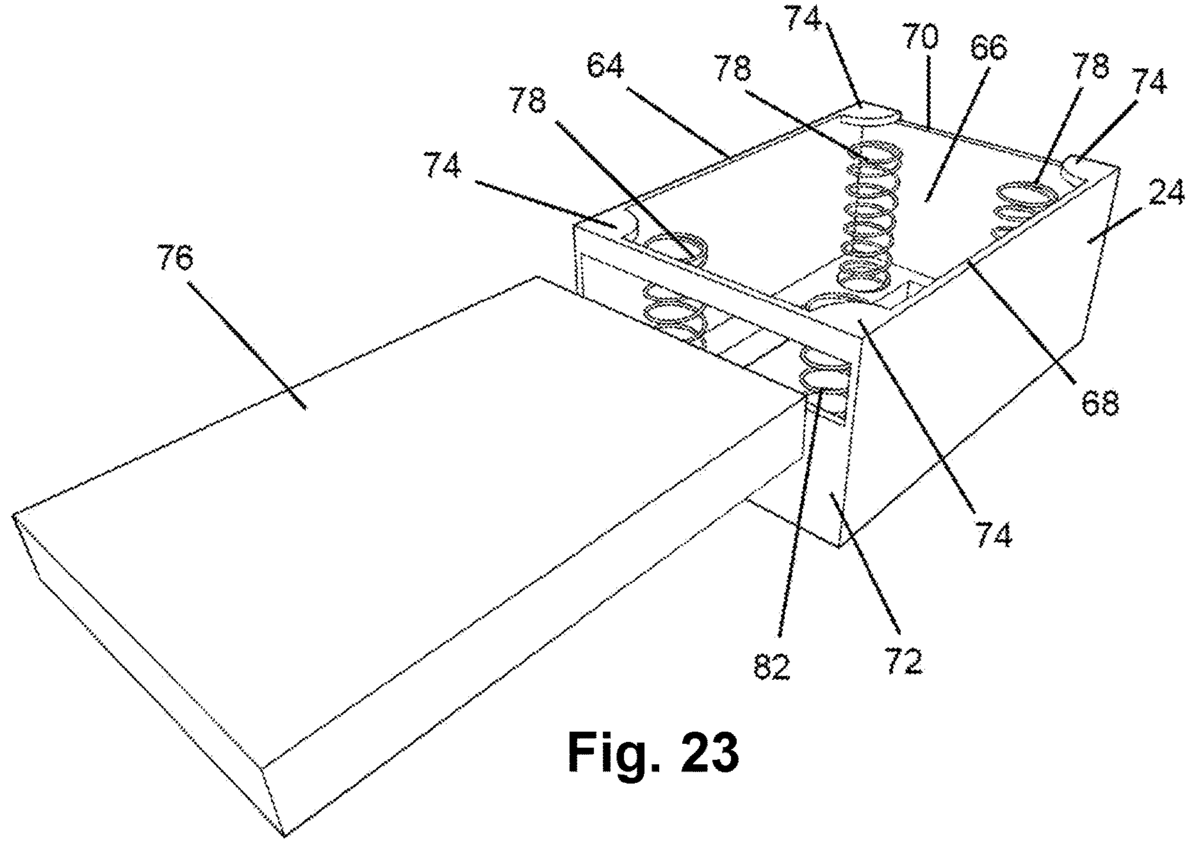
FIG. 23 is a perspective view of the dispenser with the support plate removed.

The dispenser 24 also includes a dispenser loading slot 82 that may be disposed on the second end 72 of the dispenser body 64. The loading slot 82 communicates through the dispenser body 64 to the internal volume 66. As shown by FIG. 22, the loading slot 82 has a slot length and width sized to receive the pressure plate 76 and is also sized to receive a stack of the substrate 22. To use the dispenser loading slot 82, a user will depress the pressure plate 76 against the pressure of the spring 78 until the loading slot 82 is exposed. The user then will insert the stack of the substrate 22 through the loading slot 82 and into the dispenser internal volume 66. The user will release the dispenser pressure plate 28, while pressing downward and inward on the stack of substrate 22, so that the stack of substrate 22 slides into and is fully contained within the dispenser body 64. The user will release the stack of the substrate 22 so that the springs 30 press the dispenser pressure plate 28 against the stack of substrate 22 and the dispenser pressure plate 28 presses the topmost substrate 22 in the stack against the underside of the stops 32. The topmost substrate 22 is then displayed on the top of the dispenser 24, ready for drawing. The user will then place the dispenser 24 on the platform 20, ready for the robot arm 2 to draw on the topmost substrate 22 in the stack.

The following is a list of the numbered elements referred to in the specification and the drawings.

Robot arm 2
base 4
arrow 6
robot arm axis of rotation 8
operating end 10
axial direction 12
radial direction 14
holder 16
drawing implements 18
platform 20
substrate 22
dispenser 24
Storage location 26
a holder longitudinal axis 28
Ejecting pins 30
Drawing implement longitudinal axis 32
A storage location longitudinal axis 34
Ejecting pin guard 36
a holder first end 38
a holder second end 40
a holder opening 42
A holder magnetic element 44
Drawing implement magnetic element 46
Drawing element first end 48
Drawing element second end 50
Drawing element drawing tip 52
a hole 54
Implement engagement surface 56
a robot arm engagement surface 58
Magnetic features 60
Physical features 62
Clamp 63
Dispenser body 64
Dispenser internal volume 66
Dispenser top side 68
Dispenser first end 70
Dispenser second end 72
Dispenser stop 74
Pressure plate 76
Spring 78
Dispensing slot 80
Dispenser loading slot 82
Clamp 84

What is claimed is:

1. An automated drawing apparatus, the apparatus comprising:

a) a robot arm, the robot arm defining a robot arm axis of rotation, the robot arm having an operating end, the operating end being rotatable with the robot arm about the robot arm axis of rotation, the operating end being movable in an axial direction parallel to the robot arm axis of rotation, the operating end being movable in a radial direction with respect to the robot arm axis of rotation;

b) a frame, the robot arm being supported by the frame, the frame being configured to support a substrate;

c) at least one storage location, the at least one storage location being configured to support and retain a writing implement, the writing implement being configured to mark the substrate;

d) a microprocessor operably attached to the robot arm, the microprocessor having a configuration to cause the operating end of the robot arm to selectably move to the the storage location, to engage the writing implement, to move the writing implement to the substrate, to mark the substrate with the writing implement, to return the writing implement to the storage location, and to release the writing implement to the storage location.

2. The apparatus of claim 1 wherein the storage location has a storage location longitudinal axis, the storage location longitudinal axis being substantially parallel to the robot arm axis of rotation, the writing implement having a writing implement longitudinal axis, the writing implement longitudinal axis being substantially parallel to the storage location longitudinal axis when writing implement is supported and retained by the storage location.

3. The apparatus of claim 2 wherein the at least one storage location is at least two storage locations, the at least two storage location being supported by the frame, the at least two storage locations being radially disposed about the robot arm axis of rotation and substantially equidistant from the robot arm axis of rotation, the frame defining a relative relative location of each of the robot arm axis of rotation, the at least two storage locations, and the substrate.

4. The apparatus of claim 3, the apparatus further comprising: a holder, the holder being attached to and supported by the robot arm operating end, the holder being configured to engage and retain the writing implement when the holder is placed in contact with writing implement by the robot arm.

5. The apparatus of claim 4 wherein the holder is generally tubular in shape, the holder having a holder longitudinal axis, the holder longitudinal axis being substantially parallel to the robot arm axis of rotation and the storage location longitudinal axis, the holder being configured to receive and retain the writing implement.

6. The apparatus of claim 5 wherein the configuration of the holder to receive and retain the writing implement comprising: the holder having a holder first end, a holder second end and a holder interior volume, the holder first end defining a holder opening communicating to the holder interior volume, the holder configured to receive the writing implement through the holder opening, a one of a pair of mutually attractive magnetic elements being disposed at the holder second end, the other of the pair of mutually attractive magnetic elements being disposed on the writing implement so that the pair of mutually attractive magnetic elements are in close physical proximity when the holder and the writing implement are in engagement, the mutually attractive magnetic elements are configured to retain the writing implement to the holder when the holder and the writing implement are in engagement.

7. The apparatus of claim 6 wherein the holder has a configuration to selectably release the writing implement from engagement, the configuration to selectably release the writing implement from engagement comprising: the holder having a hole defined by the holder second end, the hole being aligned with the holder longitudinal axis, the hole being configured to receive an ejecting pin to push the writing implement out of engagement with holder.

8. The apparatus of claim 7, the apparatus further comprising: the ejecting pin, the ejecting pin having an ejecting pin longitudinal axis, the ejecting pin being supported by the frame so that the ejecting pin longitudinal axis is aligned with and in a spaced apart relation to a corresponding storage location longitudinal axis.

9. The apparatus of claim 8 wherein the robot arm axis of rotation is vertically oriented and wherein an upward vertical movement of the robot arm operating end when the holder longitudinal axis coincides with the storage location longitudinal axis will cause the ejecting pin to penetrate the hole defined by the holder second end and to push the writing implement that is in engagement with the holder out of engagement with the holder and wherein the alignment of the ejecting pin longitudinal axis and the storage location longitudinal axis will cause the writing implement to fall by gravity into the storage location.

10. The apparatus of claim 9 wherein the at least two storage locations comprises a plurality of storage locations and wherein each of the storage locations is radially disposed equidistant from the robot arm axis of rotation and wherein the ejecting pin comprises a plurality of the ejecting pins and each of the ejecting pins is supported by the frame in a spaced apart relation to a corresponding storage location so that each ejecting pin longitudinal axis coincides with the corresponding storage location longitudinal axis.

11. The apparatus of claim 4 wherein the holder comprises a robot arm engagement surface configured to magnetically engage with a mating writing implement engagement surface defined by the writing implement, wherein the writing implement engagement surface is in a spaced-apart relation to the writing implement longitudinal axis.

12. The apparatus of claim 11 wherein at least one location on the robot arm engagement surface is substantially parallel to the robot arm axis of rotation, and wherein at least one location of the writing implement engagement surface is parallel to the writing implement longitudinal axis, the at least one location on the writing implement longitudinal axis being parallel to the robot arm longitudinal axis when the robot arm is in engagement with the writing implement.

13. The apparatus of claim 12 wherein at least a one of a pair of mutually attractive magnetic elements is disposed on the robot arm engagement surface, the one of the pair of mutually attractive magnetic elements being configured to attract the other of the pair of mutually attractive magnetic elements attached to the writing instrument engagement surface to secure the writing instrument to the robot arm operating end when the robot arm engagement surface and the writing implement engagement surface are in engagement.

14. The apparatus of claim 13 wherein the robot arm engagement surface includes at least one robot arm physical feature that mateably engages a corresponding writing implement physical feature, the robot arm physical feature being configured to resist a rotation of the writing implement in a direction tangent to the radial direction when the robot arm engagement surface and the writing implement engagement surface are in engagement.

15. The apparatus of claim 14 wherein the robot arm physical feature comprises a shape extending from the robot arm engagement surface or a depression in the surface of the robot arm engagement surface corresponding to the shape extending from the writing implement engagement surface.

16. The apparatus of claim 4, the apparatus further comprising:

a) a dispenser, the dispenser having a body, the body defining a dispenser internal volume and a dispenser top side, the dispenser top side being open, the dispenser top side defining a top side stop, the dispenser having a dispenser length and a dispenser width, the dispenser length and dispenser width configured to accommodate a stack of the substrates within the interior volume;

b) a pressure plate, the pressure plate being disposed within the dispenser internal volume and configured to support the stack of substrates within the interior volume and against the top side stop when the stack of substrates is disposed within the dispenser interior volume;

c) at least one spring, the at least one spring being disposed within the dispenser interior volume and configured to urge the pressure plate against the stack of substrates and a top substrate in the stack of substrates against the dispenser top side stop when the stack is disposed within the dispenser interior volume.

17. The apparatus of claim 16 wherein the holder is configured to engage and retain a friction member when the holder is placed in contact with the friction member by the robot arm;

d) a slot defined by the dispenser body and the top side stop, the slot being configured to dispense a one of the substrates when the holder engages the friction member and the microprocessor causes the robot arm to engage the top substrate with the friction member and to push the friction member toward the slot.

18. The apparatus of claim 16 wherein the dispenser body defines a loading slot, the loading slot having a configuration to receive the stack of the substrate when a user depresses the pressure plate to expose the slot.

19. An automated drawing apparatus, the apparatus comprising:

a) a robot arm, the robot arm defining a robot arm axis of rotation, the robot arm having an operating end, the operating end being rotatable with the robot arm about the robot arm axis of rotation, the operating end being movable in an axial direction parallel to the robot arm axis of rotation, the operating end being movable in a radial direction with respect to the robot arm axis of rotation;

b) a frame, the robot arm being supported by the frame;

c) at least one storage location, the at least one storage location being configured to support and retain a writing implement, the writing implement being configured to mark a substrate;

d) a substrate supported by the frame;

e) a microprocessor operably attached to the robot arm, the microprocessor and the robot arm having a configuration to cause the operating end of the robot arm to selectably move to the the storage location, to engage the writing implement, to move the writing implement to the dispenser, to mark the substrate with the writing implement, and to return the writing implement to the storage location;

f) a holder, the holder being attached to the robot arm operating end, the holder being generally tubular in shape and configured to receive the writing implement, the holder having a holder longitudinal axis substantially parallel to the robot arm axis of rotation, the holder defining a hole aligned with the holder longitudinal axis;

g) an ejecting pin, the ejecting pin having an ejecting pin longitudinal axis, the ejecting pin being supported by the frame so that the ejecting pin longitudinal axis is aligned with and in a spaced apart relation to a corresponding storage location longitudinal axis, wherein the robot arm axis of rotation is vertically oriented and wherein the ejecting pin and the storage location are configured so that an upward vertical movement of the robot arm operating end when the holder longitudinal axis coincides with the storage location longitudinal axis will cause the ejecting pin to penetrate the hole and to push the writing implement out of engagement with the holder.

20. The apparatus of claim 19 wherein the alignment of the ejecting pin longitudinal axis and the storage location longitudinal axis cause the writing implement to fall by gravity into the storage location when the ejecting pin pushes the writing implement out of engagement with the holder.

* * * * *